United States Patent
Kameda et al.

(10) Patent No.: US 7,436,628 B2
(45) Date of Patent: Oct. 14, 2008

(54) PERPENDICULAR MAGNETIC RECORDING HEAD FOR REDUCING THE WIDTH OF MAGNETIZATION REVERSAL BETWEEN RECORDING PATTERNS ON A RECORDING MEDIUM AND METHOD OF MANUFACTURING THE SAME

(75) Inventors: Hiroshi Kameda, Niigata-ken (JP); Kiyoshi Kobayashi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 561 days.

(21) Appl. No.: 11/092,205

(22) Filed: Mar. 29, 2005

(65) Prior Publication Data
US 2005/0219764 A1    Oct. 6, 2005

(30) Foreign Application Priority Data
Mar. 31, 2004   (JP)   ............... 2004-105657

(51) Int. Cl.
*G11B 5/187*    (2006.01)
*G11B 5/147*    (2006.01)
(52) U.S. Cl. ................................. 360/125.1; 360/125.2
(58) Field of Classification Search ............ 360/125.09, 360/125.1, 125.11, 125.13, 125.14, 125.15, 360/125.19, 125.2, 125.21, 125.63, 125.64
See application file for complete search history.

(56) References Cited

U.S. PATENT DOCUMENTS

| | | | | |
|---|---|---|---|---|
| 4,763,215 | A * | 8/1988 | Gueugnon et al. ..... | 360/125.13 |
| 5,495,379 | A * | 2/1996 | McNeil et al. ......... | 360/125.13 |
| 5,920,449 | A * | 7/1999 | Tagawa ................. | 360/122 |
| 6,560,076 | B1 * | 5/2003 | Yazawa et al. ......... | 360/317 |
| 6,950,277 | B1 * | 9/2005 | Nguy et al. ............ | 360/124.14 |
| 6,952,325 | B2 * | 10/2005 | Sato et al. ............. | 360/125.08 |
| 7,196,871 | B2 * | 3/2007 | Hsu et al. .............. | 360/125.03 |
| 2002/0012195 | A1 | 1/2002 | Lahiri et al. | |
| 2002/0080523 | A1 * | 6/2002 | Sato et al. ............. | 360/126 |
| 2002/0131204 | A1 | 9/2002 | Mochizuki et al. | |
| 2003/0021063 | A1 * | 1/2003 | Kuroda et al. ......... | 360/125 |
| 2003/0117749 | A1 * | 6/2003 | Shukh et al. .......... | 360/317 |
| 2004/0184191 | A1 * | 9/2004 | Ichihara et al. ....... | 360/126 |
| 2004/0228033 | A1 * | 11/2004 | Aoki et al. ............ | 360/126 |
| 2005/0041337 | A1 * | 2/2005 | Yazawa et al. ........ | 360/126 |

FOREIGN PATENT DOCUMENTS

| | | |
|---|---|---|
| EP | 1 148 473 | 10/2001 |
| JP | 62-92217 | 4/1987 |

(Continued)

*Primary Examiner*—Brian E Miller
(74) *Attorney, Agent, or Firm*—Brinks Hofer Gilson & Lione

(57) ABSTRACT

A concave portion is formed on the end surface of a main magnet pole layer on the trailing side. A convex portion is formed on the end surface of a return yoke layer on the leading side, which opposes the concave portion formed on the end surface of the main magnet pole layer on the trailing side, and the distance (gap length) between the main magnet pole layer and the return yoke layer in the direction of the film thickness is constant. Consequently, the magnetic field generating from the main magnet pole layer toward the recording medium is appropriately prevented from isotropically spreading in the trailing direction, and the width of magnetization reversal between the recording patterns, which are magnetized reversely from each other, can be reduced over the entire area.

4 Claims, 13 Drawing Sheets

FOREIGN PATENT DOCUMENTS

| | | |
|---|---|---|
| JP | 2000-031147 | 1/2000 |
| JP | 2001-526440 | 12/2001 |
| JP | 2002-92820 | 3/2002 |
| JP | 2002-197612 | 7/2002 |
| JP | 2002-208115 | 7/2002 |
| JP | 2002-279606 | 9/2002 |
| WO | WO 00/77777 | 12/2000 |

* cited by examiner

PERPENDICULAR MAGNETIC RECORDING HEAD FOR REDUCING THE WIDTH OF MAGNETIZATION REVERSAL BETWEEN RECORDING PATTERNS ON A RECORDING MEDIUM AND METHOD OF MANUFACTURING THE SAME

This application claims the benefit of priority to Japanese Patent Application No. 2004-105657 filed on Mar. 31, 2004, herein incorporated by reference.

BACKGROUND OF THE INVENTION

1. Field of the Invention

The present invention relates to a perpendicular magnetic recording head for recording on a medium surface of a recording medium such as a disk by providing a magnetic field in the perpendicular direction, and more specifically, a perpendicular magnetic recording head capable of reducing the width of magnetization reversal (width of magnetization transition) between recording patterns recorded on the recording medium, which are magnetized reversely from each other, and approximating the magnetic field line on the trailing side of the recording patterns to the direction parallel with the direction of the width of the track, and a method of manufacturing the same.

2. Description of the Related Art

A magnetic head shown in FIG. 26 is a structure (partial cross-sectional view) of a perpendicular magnetic recording head in the related art. The perpendicular magnetic recording system of magnetizing the medium in the perpendicular direction with respect to the medium surface of the recording medium can record magnetic data with high degree of density in comparison with a system of magnetizing the medium in the horizontal direction with respect to the medium surface.

Reference numeral 1 designates a main magnet pole layer and reference numeral 2 designates a return yoke layer. In the vertical magnetic recording head shown in FIG. 26, the return yoke layer 2 is provided on the leading side when viewed from the main magnet pole layer 1 (lower side in the drawing). The perpendicular magnetic recording head of this type is referred to as a single magnet pole head.

A recording medium 3 has, for example, a disk shape, and includes a soft layer having a high magnetic transmission coefficient (lining layer) 3a, a non-magnetic intermediate layer 3b for aligning the crystalline orientation of a recording layer 3c, and the recording layer 3c having a high coercive force and formed mainly of Co laminated in sequence from the bottom.

The vertical recording head shown in FIG. 26 provides the perpendicular magnetic field to the recording medium 3, and magnetizes the recording layer 3c of the recording medium 3 in the perpendicular direction.

The recording medium 3 is rotated about the center of the disk as the center of axis of rotation, and the recording medium 3 moves from the leading side to the trailing side of the perpendicular magnetic recording head which rises from the recording medium 3 as shown in FIG. 26.

As shown in FIG. 26, a recording magnetic field 4 is generated from the main magnet pole layer 1 toward the recording medium 3, and the recording magnetic field 4 passes through the recording layer 3c--> the intermediate layer 3b--> the soft layer 3a of the recording medium 3, and then comes back to the return yoke layer 2. The recording layer 3c is magnetized in the perpendicular direction by being provided with the perpendicular magnetic field from the main magnet pole layer 1. As shown in FIG. 26, however, since the distance from the front end surface of the main magnet pole layer 1 to the soft layer 3a is long, the recording magnetic field 4 spreads isotropically from the main magnet pole layer 1 to the recording medium 3 in the single magnet pole head, and as shown in FIG. 27, when the recording pattern recorded on the recording medium 3 was observed by the magnetic force microscope (MFM), it was found that the magnetic field line on the trailing side of the recording pattern is curved into the trailing direction from the edge to the center.

When the magnetic field line on the trailing side of the recording pattern recorded on the recording medium 3 is curved, there arose a problem that the reproducing output which is obtained when the reproduction device such as a MR head or the like is traveled on the recording pattern was deteriorated.

On the magnetic field line on the trailing side, since the magnetic field line on the trailing side is curved, the reproduction device reads the adjacent recording pattern of reversed magnetization as well, thereby generating noise.

In the case of the single magnet pole head provided with the return yoke layer 2 on the leading side when viewed from the main magnet pole layer 1 as shown in FIG. 26, the recording magnetic field 4 spreads isotropically from the main magnet pole layer 1 as described above, and the strength of the recording magnetic field 4 is decreased as it spreads toward the trailing side or the leading side. Since the recording medium 3 moves from the leading side to the trailing side of the perpendicular magnetic recording head, the isomagnetic line spread toward the trailing side is overwritten on the magnetic field line on the leading side of the recording pattern recorded previously on the magnetic medium 3. Therefore, the recording magnetic field which has low strength spreading toward the trailing side causes a phenomenon to increase the width of magnetization reversal (width of magnetization transition) between the recording patterns which are magnetized reversely from each other. Therefore, there is a problem such that when the reproduction device is traveled on the recording pattern, increased noise of magnetization reversal is generated in the obtained reproduction output due to the wide width of the magnetization reversal. Consequently, the single magnet pole head shown in FIG. 26 is a structure in which the S/N ratio is significantly undesirable.

Patent Documents shown below disclose an improved structure of the main magnet pole layer of the single magnet pole head shown in FIG. 26 (Japanese unexamined patent application publication No.2002-279606), or a shield pole structure provided with the return yoke layer on the trailing side when viewed from the main magnet pole layer (US2003/0117749 A1, JP-A-2002-92820).

In Japanese Unexamined Patent Application Publication No.2002-279606, as shown in FIG. 1, for example, the upper surface side (trailing side) of the main magnet pole layer 1 has a concave shape. The effects of such a shape is described in the patent publication such that "Accordingly, there is provided the perpendicular recording magnetic head which enables recording of the bits without bending the shape of the magnetization reversal and is free from such problems that the width of magnetization reversal looks larger when reproducing the magnetic resistant effect type head thereby increasing the half width of the solitary wave and the width of recording track is reduced with increase in track recording density . . . ([0012]in Specification of Japanese Unexamined Patent Application Publication No.2002-279606).

However, since the device disclosed in Japanese Unexamined Patent Application Publication No.2002-279606 is the single magnet pole head, the broadening of the width of magnetization reversal cannot be reduced. As shown in FIG.

28, according to the perpendicular magnetic recording head in Japanese Unexamined Patent Application Publication No.2002-279606, it is considered that particularly the portion near the center of the magnetic field line on the trailing side of the recording pattern can be approximated to the direction parallel with the direction of the width of the track. The shape of the magnetic field line on the trailing side is significantly influenced by the shape of the end surface of the main magnet pole layer on the trailing side. In other words, in the perpendicular magnetic recording head shown in FIG. 26, the end surface of the main magnet pole layer 1 on the trailing side is flat surface. In this case, as shown in FIG. 27, since the portion of the magnetic field line on the trailing side of the main magnet pole layer near the center is bent toward the trailing direction, it is considered that the portion of the magnetic field line on the trailing side of the recording pattern near the center can be controlled to a substantially flat shape as shown in FIG. 28 by forming the end surface of the main magnet pole layer on the trailing side into a concave shape as shown in Japanese Unexamined Patent Application Publication No.2002-279606.

However, as shown above, since the device in Japanese Unexamined Patent Application Publication No.2002-279606 is the single magnet pole head, the recording magnetic field generated from the main magnet pole layer is spread isotropically as described in conjunction with FIG. 26, and consequently, as shown in FIG. 28, the width of the magnetization reverse (width of magnetization transition) between the recording patterns which are magnetized reversely from each other increases, and the noise of magnetization reversal due to the broadening of the width of the magnetization reversal cannot be reduced suitably. Therefore, the S/N ratio cannot be improved even with the perpendicular magnetic recording head in Japanese Unexamined Patent Application Publication No.2002-279606.

US2003/0117749 A1 discloses a shield pole structure in which the return yoke layer (return pole) 206 is formed on the trailing side when viewed from the main magnet pole layer (main pole) 204 in the perpendicular magnetic recording head as shown in FIG. 5 and FIG. 6. Reference numeral 201 represents a traveling direction of the reproduction/recording head 200.

In the perpendicular magnetic recording head having such a shield pole structure, since the return yoke layer 206 exists on the trailing side, it is considered that the recording magnetic field generating from the main magnet pole layer 204 can hardly spread isotropically toward the trailing side, and consequently, the width of magnetization reversal (width of magnetization transition) between the recording patterns, which are magnetized reversely from each other can be reduced.

However, as shown in FIG. 29, since the end surface of the main magnet pole layer 204 on the trailing side is a flat surface, the same problem as in the single magnet pole head described in conjunction with FIG. 26 and FIG. 27, that is, the problem that the magnetic field line on the trailing side of the recording pattern protrudes toward the trailing side from the edges to the center cannot be solved yet, and consequently, lowering of the output or deterioration of the S/N ratio is resulted.

In Japanese Unexamined Patent Application Publication No.2002-92820, a perpendicular magnetic recording head of the shield pole type is disclosed as in US2003/0117749 A1. In Japanese Unexamined Patent Application Publication No.2002-92820, as shown in FIG. 4, a projecting portion 36 projecting toward the main magnet pole 31 is provided on the end surface of the return path magnet pole layer 32 on the leading side. With the provision of such a projecting portion 36, this patent publication describes "Broadening of the magnetic field distribution at the track edge, which is caused by broadening of the magnetic flux in the direction of the width of the track when the magnetic field passes through the soft magnetic layer of the recording medium from the main magnet pole, can be restrained. Therefore, formation of the sharp track edge is enabled, whereby improvement of the track density by narrowing the track width is achieved." (See [0028] in Specification of Japanese Unexamined Patent Application Publication No.2002-92820).

However, since the end surface of the main magnetic pole 31 on the trailing side is flat surface also in the perpendicular magnetic recording head of the shield pole type disclosed in Japanese Unexamined Patent Application Publication No.2002-92820 as in the case of US2003/0117749 A1, the problem that the magnetic field line on the trailing side of the recording pattern protrudes toward the trailing side from the edges to the center cannot be solved yet, and consequently, lowering of the output or deterioration of the S/N ratio is resulted. In addition, in the Japanese Unexamined Patent Application Publication No.2002-92820, the width of magnetization reversal is wider at the position near the edge of the magnetic field line on the trailing side as will be described referring to FIG. 5, and hence there arises a problem such that when the reproduction device travels on that position, the noise of magnetization reversal increases and hence deterioration of the S/N ratio is resulted.

SUMMARY OF THE INVENTION

In order to solve the above-described problems in the related art, it is an object of the invention in particular to provide a perpendicular magnetic recording head capable of reducing the width of magnetization reversal (width of magnetization transition) between recording patterns recorded on the recording medium, which are magnetized reversely from each other, and approximating the magnetic field line on the trailing side of the recording patterns to the direction parallel with the direction of the width of the track, and a method of manufacturing the same.

A perpendicular magnetic recording head according to the present invention includes a main magnet pole layer formed of magnetic material, and a return yoke layer being formed of magnetic material and opposing to the main magnet pole layer with the intermediary of a non-magnetic gap layer on the side of the surface opposing to a recording medium and on the trailing side of the main magnet pole layer, wherein the end surface of the main magnet pole layer on the trailing side is depressed at the center in the direction of the width of the track on the trailing side with respect to one of the end on the trailing side, and wherein the end surface of the return yoke layer on the leading side is formed with a convex portion at a position opposing to a concave portion formed on the end surface of the main magnet pole layer on the trailing side in the direction of the film thickness, and the distance between the main magnet pole layer and the return yoke layer in the direction of the film thickness is constant.

As described above, the perpendicular magnetic recording head according to the invention is a perpendicular magnetic recording head of a shield pole type provided with the return yoke layer on the trailing side when viewed from the main magnet pole layer.

In the invention, the concave portion is formed on the end surface of the main magnet pole layer on the trailing side. The concave portion is depressed at least at the center in the direction of the width of the track on the trailing side with respect to one of the end on the trailing side, and consequently, the magnetic field line of the recording pattern to be recorded on the recording medium on the trailing side can be approximated appropriately to the direction parallel to the direction of the width of the track.

In the invention, the end surface of the return yoke layer on the leading side is formed with the convex portion at a position opposing to the concave portion formed on the end surface of the main magnet pole layer on the trailing side in the direction of the film thickness, and the distance (gap length) between the main magnet pole layer and the return yoke layer in the direction of the film thickness is constant. Consequently, the recording magnetic field generated from the main magnet pole layer to the recording medium is adequately prevented from isotropically spreading in the trailing direction, and the width of magnetization reversal can be reduced in the entire area between the recording patterns, which are magnetized reversely from each other.

Accordingly, in the invention, the S/N ratio when reproducing by the reproduction device can be improved, and the output can also be improved.

Preferably, the cross-sections of the concave portion and the convex portion taken in the direction parallel to the surfaces opposing to the recording medium are gradually inclined or bent from both ends in the direction of the width of the track toward the center. More preferably, in the invention, the cross sections of the concave portion and the convex portion taken along the direction parallel to the surfaces opposing to the recording medium are both curved.

Accordingly, in the invention, the magnetic field line of the recording pattern on the trailing side can be approximated to the direction parallel to the direction of the width of the track effectively over the entire area from the edges to the center.

Preferably, the maximum widths of the concave portion and the convex portion in the direction of the width of the track are identical. Accordingly, the width of magnetization reversal between the adjacent recording patterns can be effectively reduced over the entire area from the edges to the center, and the width of the track can be narrowed.

A method of manufacturing the perpendicular magnetic recording head according to the present invention is characterized by the following steps.

(a) a step of forming a main magnet pole layer with magnetic material;

(b) a step of forming first insulating layers at least on both sides of the main magnet pole layer in the direction of the width of the track;

(c) a step of milling the upper surface of the main magnet pole layer to form a concave portion on the upper surface of the main magnet pole layer, the concave portion being formed from the surface opposing to the recording medium in the height direction so as to have a larger depth at the center than the both ends in the direction of the width of the track, (d) a step of forming a non-magnetic gap layer from the upper surface of the first insulating layer to the upper surface of the main magnet pole layer at a constant film thickness; and (e) a step of forming a return yoke layer on the gap layer with magnetic material, and forming a convex portion on the lower surface of the return yoke layer opposing to the concave portion formed on the main magnet pole layer in the direction of the film thickness via the gap layer of the constant film thickness.

In the invention, in the aforementioned step (b), insulating material having a milling rate for ion milling lower than that of the main magnet pole layer is preferably selected for the first insulating layer.

In the invention, in the aforementioned step (c), the upper surface of the main magnet pole layer is milled by ion milling whereof the direction of ion irradiation is obliquely inclined with respect to the direction of the film thickness, whereby the concave portion having a larger depth at the center than the both sides in the direction of the width of the track is formed on the upper surface of the main magnet pole layer.

The concave portion can be formed on the upper surface of the main magnet pole layer (end surface on the trailing side) by forming the first insulating layers having a lower milling rate for ion milling than the main magnet pole layer on both sides of the main magnet pole layer as in the step (b), and utilizing the difference of etching rate in the step (c).

Since the gap layer to be formed on the concave portion formed on the main magnet pole layer can be formed into a uniform thickness, for example, by forming a non-magnetic gap layer by a sputtering process and the upper surface of the gap layer is also formed with the concave portion at a position opposing to the concave portion of the main magnet pole layer in the direction of the film thickness in the step (d), the convex portion can be formed on the return yoke layer formed in the step (e) at a position opposing to the concave portion of the main magnet pole layer in the direction of the film thickness.

Alternatively, a method of manufacturing the perpendicular magnetic recording head according to the invention is characterized by the following steps.

(f) a step of forming a main magnetic layer with magnetic material;

(g) a step of forming second insulating layers at least on both sides of the main magnet pole layer in the direction of the width of the track;

(h) a step of forming third insulating layers formed of a different material from that of the second insulating layer on both sides of the second insulating layer;

(i) a step of milling the upper surface of the main magnet pole layer to form a concave portion on the upper surface of the main magnet pole layer, the concave portion being formed from the surface opposing to the recording medium in the height direction so as to have a larger depth at the center than the both ends in the direction of the width of the track;

(j) a step of forming a non-magnetic gap layer from the upper surfaces of the second insulating layer and the third insulating layer to the main magnet pole layer at a constant film thickness; and (k) a step of forming a return yoke layer on the gap layer with magnetic material and forming a convex portion on the lower surface of the return yoke layer opposing to the concave portion formed on the main magnet layer in the direction of the film thickness via the gap layer at a constant film thickness.

In the invention, insulating materials having different etching rates for the CMP are used for the third insulting layer and the second insulating layer in the step (g) and the step (h), and the concave portion is formed on the main magnet pole layer using the difference in etching rate in the step (i).

Preferably, the second insulating layers are formed of the insulating material having lower etching rate for the CMP than the main magnet pole layer in the step (g);

the second insulating layers are formed from the both end surfaces of the main magnet pole layer in the direction of the width of the track along the upper surface thereof in the step (g);

the third insulating layers having higher etching rate at least than the second insulating layers are formed on the second insulating layers in the step (h); and the third insulating layers and the second insulating layers are milled until the upper surface of the main magnet pole layer is exposed with the CMP and when the main magnet pole layer is exposed, the CMP is further performed utilizing the difference in etching rate for the CMP between the second insulating layers remaining on the both end surfaces of the main magnet pole layer and the main magnet pole layer to form the concave portion on the upper surface of the main magnet pole layer in the step (i).

Preferably, the second insulating layers are formed using insulating material having lower etching rate for the CMP than the main magnet pole layer in the step (g);

the second insulating layers are formed from the both sides of the main magnet pole layer in the direction of the width of the track to the upper portion thereof in the step (g);

the third insulating layers serving as stoppers having a lower etching rate than the main magnet pole layer and the second insulating layers are formed on the second insulating layers in the step (h), and the third insulating layers and the second insulating layers are milled until the upper surface of the main magnet pole layer is exposed, and at this time, the concave portion increasing gradually in depth toward the center of the main magnet pole layer in the direction of the width of the track is formed on the upper surfaces of the second insulating layers and the main magnet pole layer located on the inner side than the third insulating layers in the direction of the width of the track utilizing the difference in etching rate of the main magnet pole layer, the second insulating layers, and the third insulating layers while making the third insulating layers on both sides of the main magnet pole layer located at positions apart therefrom serve as stoppers.

In the manufacturing method as described above, by utilizing the difference in etching rate for the CMP of the main magnet pole layer, the second insulating layer, and the third insulating layer, the predetermined concave portion can be formed on the upper surface of the main magnet pole layer appropriately and easily.

The perpendicular magnetic recording head according to the invention is of a shield pole type provided with the return yoke layer on the trailing side when viewed from the main magnet pole layer.

In the invention, the concave portion is formed on the end surface of the main magnet pole layer on the trailing side. The concave portion has a shape depressed at least at the center in the direction of the width of the track in the trailing side than one of the trailing ends, whereby the magnetic field line of the recording pattern to be recorded on the recording medium on the trailing side can be approximated to the direction parallel to the direction of the width of the track appropriately.

In the invention, the convex portion is formed on the end surface of the return yoke layer on the leading side opposing to the concave portion formed on the end surface of the main magnet pole layer on the trailing side in the direction of the film thickness, and the distance (gap length) between the main magnet pole layer and the return yoke layer in the direction of the film thickness is constant. Consequently, the magnetic field generating from the main magnet pole layer toward the recording medium is appropriately prevented from isotropically spread in the trailing direction, and the width of magnetization reversal between the recording patterns, which are magnetized reversely from each other, can be reduced over the entire range.

Therefore, according to the invention, the S/N ratio when reproducing by the reproduction device can be improved, whereby the output can also be improved.

DESCRIPTION OF THE PREFERRED EMBODIMENTS

Figure 1:
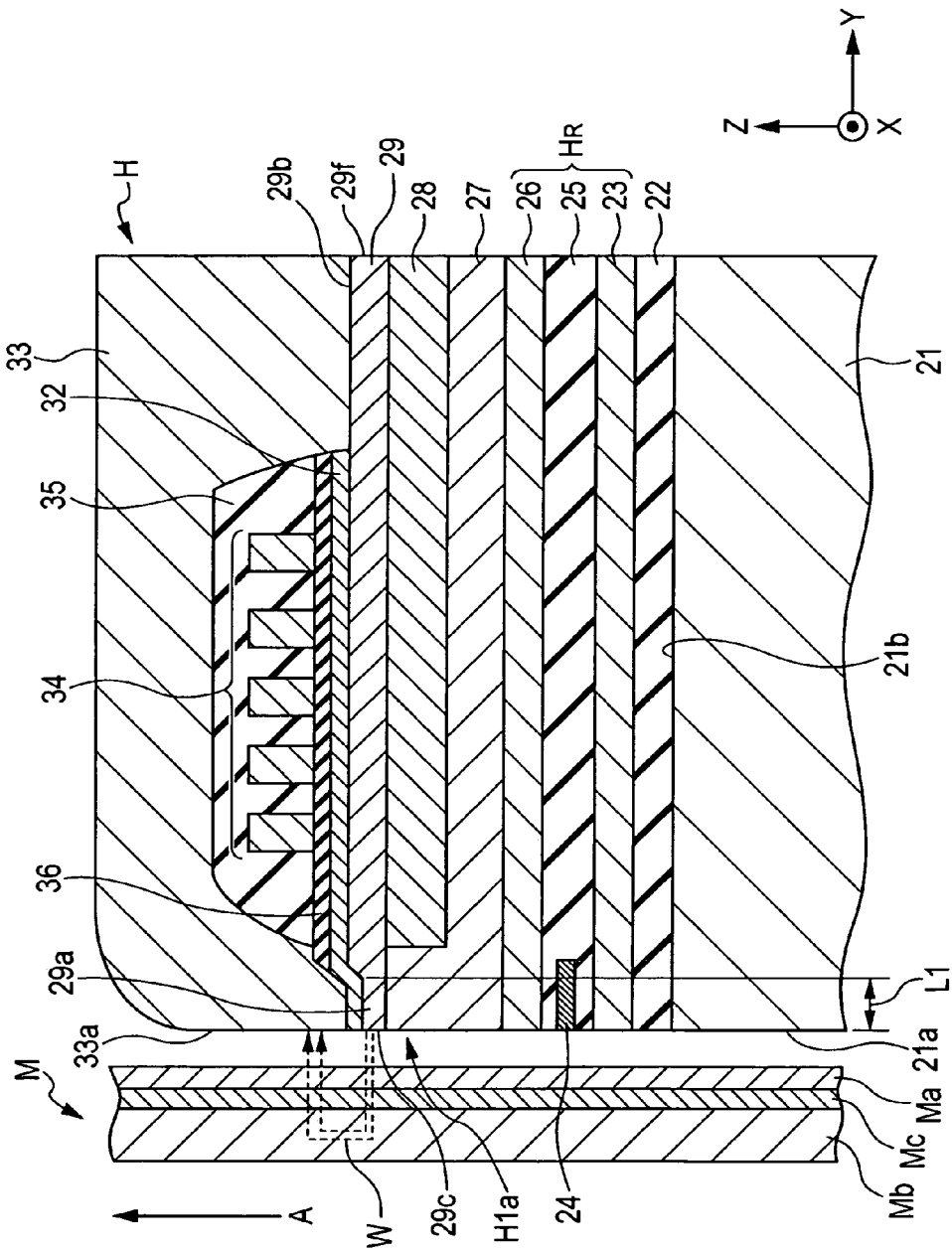
FIG. 1 is a vertical cross-sectional view showing a structure of a perpendicular magnetic recording head according to the present invention.

FIG. 1 is a vertical cross-sectional view showing a structure of a perpendicular magnetic recording head H according to the present invention.

The perpendicular magnetic recording head H shown in FIG. 1 provides a perpendicular magnetic field to a recording medium M for magnetizing a recording layer Ma of the recording medium M in the perpendicular direction.

The recording medium M is, for example, disk shape, and includes a recording layer Ma having a high coercive force Hc on the surface thereof, and a soft layer (lining layer) Mb having a high magnetic transmission coefficient provided inwardly of the recording layer Ma via a non-magnetic intermediate layer Mc for aligning the crystalline orientation of the recording layer Ma, and is rotated about the center of the disk as an axis of rotation.

A slider 21 is formed of non-magnetic material such as $Al_2O_3$ or TiC. When an opposing surface 21a of the slider 21 opposes the recording medium M and the recording medium M rotates, the slider 21 rises from the surface of the recording medium M or slides on the recording medium M by the airflow on the surface. In FIG. 1, the direction of movement of the recording medium M with respect to the slider 21 is a direction A.

An end surface 21b of the slider 21 on the trailing side is formed with a non-magnetic insulating layer 22 formed of inorganic material such as $Al_2O_3$ or $SiO_2$, and a reading portion $H_R$ is formed on the non-magnetic insulating layer 22.

The reading portion $H_R$ includes a lower shield layer 23, an upper shield layer 26, and a reproduction device 24 located in an inorganic insulating layer (gap insulating layer) 25 between the lower shield layer 23 and the upper shield layer 26. The reproduction device 24 is a device utilizing a magnetic resistance effect such as AMR, GMR, or TMR.

A separation layer 27 formed of inorganic material such as $Al_2O_3$ or $SiO_2$ is formed on the reading portion $H_R$ and the perpendicular magnetic recording head H for recording is provided on the separation layer 27. An opposing surface H1a with respect to the recording medium of the perpendicular magnetic recording head H is substantially flush with the opposing surface 21a of the slider 21.

It is also possible to mount only the perpendicular magnetic recording head H on the end surface of the slider 21 on the trailing side without providing the reading portion $H_R$.

The perpendicular magnetic recording head H is formed with a yoke layer 28, which is plated with ferromagnetic material such as Permalloy (Ni—Fe). For example, the yoke layer 28 is embedded in the separation layer 27, and is not exposed to the opposing surface H1a with respect to the recording medium.

On the upper surface of the yoke layer 28, there is formed a plating foundation film (not shown) formed of a conductive metal film such as NiFe by sputtering process or the like.

In the embodiment shown in FIG. 1, a main magnet pole layer 29 is formed by plating via a foundation layer, not shown. The main magnet pole layer 29 is formed by being plated with ferromagnetic material, and is formed of material having high saturation magnetic flux density such as Ni—Fe—Co. The main magnet pole layer 29 is preferably formed of magnetic material of higher saturation magnetic flux density Bs than the yoke layer 28.

As shown in FIG. 1, the gap layer 32 formed of non-magnetic material is formed on the main magnet pole layer 29.

A coil insulating foundation layer 36 formed of insulating material is formed on the gap layer 32 at a position apart from the opposing surface H1a with respect to the recording medium in the height direction (direction Y in the drawing), a coil layer 34 formed of conductive material such as Cu is formed on the coil insulating foundation layer 36. The coil layer 34 is formed by frame plating technique.

The coil layer 34 is formed by pattern formation in a spiral (helical) shape having a predetermined number of turns around a connecting portion 29b where a return yoke layer 33 and the main magnet pole layer 29 are magnetically connected at the rear in the height direction of the main magnet pole layer 29.

As shown in FIG. 1, the coil layer 34 is covered with an organic insulating layer 35 formed of organic insulating material.

As shown in FIG. 1, the return yoke layer 33 formed of ferromagnetic material such as permalloy is formed at a distal end portion 29a of the main magnet pole layer 29 via the gap layer 32, and the return yoke layer 33 is formed on the insulating layer 35 spreading from over the gap layer 32 in the height direction (direction Y in the drawing) to the connecting portion 29b with respect to the main magnet pole layer 29.

As shown in FIG. 1, a front end surface 33a of the return yoke layer 33 is exposed on the opposing surface H1a with respect to the recording medium.

As shown in FIG. 1, on the inner side of the opposing surface H1a, the return yoke layer 33 and the main magnet pole layer 29 are magnetically connected via the connecting portion 29b, whereby a magnetic passage connecting the return yoke layer 33, the main magnet pole layer 29, and the yoke layer 28 is formed.

In the perpendicular magnetic recording head H shown in FIG. 1, when a recording current is applied from a lead layer, not shown, to the coil layer 34, a recording magnetic field is introduced to the return yoke layer 33, the yoke layer 28, and the main magnet pole layer 29 by the current magnetic field of current flowing through the coil layer 34. As shown in FIG. 1, on the opposing surface H1a, a recording magnetic field W is applied from a front end surface 29c of the main magnet pole layer 29 perpendicularly to the recording medium M, and the recording magnetic field W passes through the recording layer Ma of the recording medium M, then passes through the intermediate layer Mc and the soft layer Mb, and is returned to the front end surface 33a of the return yoke layer 33.

As shown in FIG. 1, since the recording medium M moves in the direction A, when viewed on a basis of a predetermined layer, the layer, being laminated on the lower side with respect to the predetermined layer, travels on the recording medium before the predetermined layer, and hence it is formed on the "leading side", and the layer, being laminated on the upper side with respect to the predetermined layer, travels on the recording medium after the predetermined layer, and hence it is formed on the "trailing side".

The "end surface on the trailing side" corresponds to the upper surface of the predetermined layer, and the "end surface on the leading side" corresponds to the lower surface of the predetermined layer.

Accordingly, the perpendicular magnetic recording head H shown in FIG. 1 has a shield pole structure in which the return yoke layer 33 is formed on the trailing side when viewed from the main magnet pole layer 29.

A characteristic portion of the present invention will be described below. The characteristic portion of the present invention is shown mainly in FIG. 2.

Figure 2:
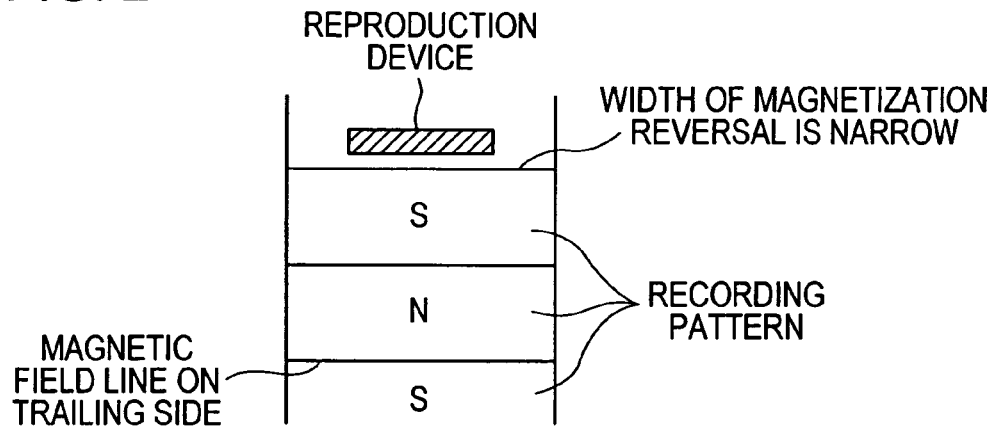
FIG. 2 a front view of the perpendicular magnetic recording head shown in FIG. 1 when viewed from the side of the opposing surface with respect to the recording medium, including a diagram of a recording pattern recorded on the recording medium.

FIG. 2 is a partial front view showing the main magnet pole layer 29 and the return yoke layer 33 from the side of the opposing surface H1a.

As shown in FIG. 2, an upper surface 29d of the main magnet pole layer 29, that is, the end surface 29d on the trailing side (in the following description, reference numeral 29d may designate "end surface on the trailing side" or "upper surface") is formed with a concave portion 29e curving so as to increase gradually in depth to the bottom from ends 29d1, 29d1 on the trailing side in the direction of the width of the track (direction X in the drawing) toward the center 29d2 on the trailing side.

Although the concave portion 29e is formed from the opposing surface H1a in the height direction (direction Y in the drawing) by a predetermined length L1 in the embodiment shown in FIG. 1, it is also possible to form continuously from the opposing surface H1a to a rear end surface 29f of the main magnet pole layer 29.

On the other hand, a lower surface 33b of the return yoke layer 33, that is, the end surface 33b on the leading side (in the following description, reference numeral 33b may designate "end surface on the leading side" or "lower surface") is formed partly with a convex portion 33c which has a curved shape projecting toward the concave portion 29e at a position opposing to the concave portion 29e formed on the main magnetic layer 29 in the direction of the thickness of the film (direction Z in the drawing).

Figure 3:
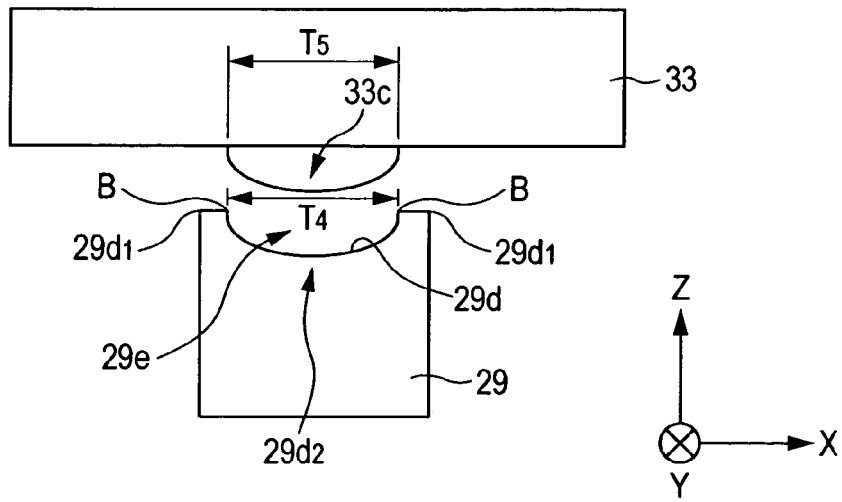
FIG. 3 is a front view of the perpendicular magnetic recording head having a structure different from FIG. 1 when viewed from the side of the opposing surface with respect to the recording medium.

In the embodiment shown in FIG. 2, the concave portion 29e formed on the end surface 29d of the main magnet pole layer 29 on the trailing side is formed so as to increase in depth to the bottom from the ends 29d1, 29d1 on the trailing side to the center 29d2 on the trailing side. However, as shown in FIG. 3, the concave portion 29e may be formed from positions B, B located inwardly of the ends 29d1, 29d1 in the direction of the width of the track (direction X in the drawing) toward the center 29d2 at the center on the trailing side.

Figure 6:
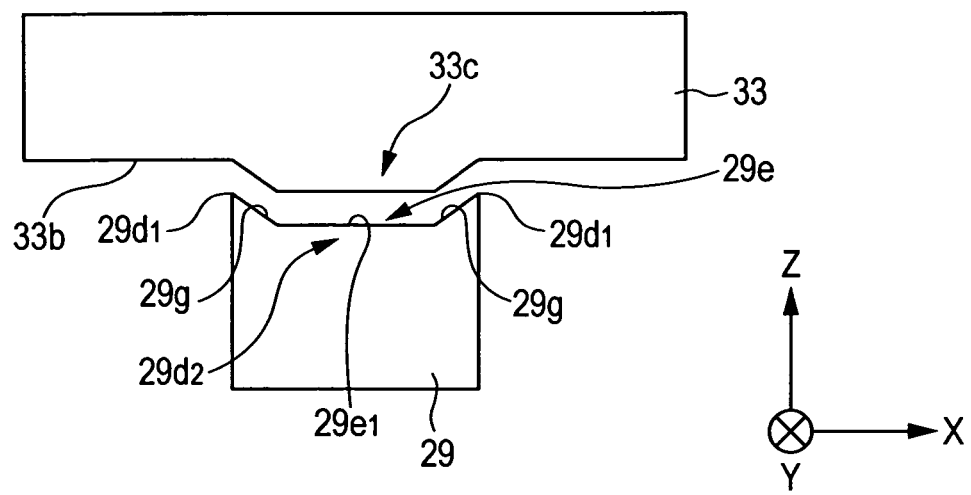
FIG. 6 is a front view of the perpendicular magnetic recording head of the invention having a different structure from FIG. 1 when viewed from the side of the opposing surface with respect to the recording medium.

In the invention, as shown in FIG. 6, the concave portion 29e formed on the end surface 29d of the main magnet pole layer 29 on the trailing side may be formed of inclined surfaces 29g, 29g formed so as to increase in depth of depression gradually from the ends 29d1, 29d1 on the trailing side toward the center 29d2 on the trailing side and a bottom surface 29e1 formed into a flat shape for connecting the inclined surfaces 29g, 29g. In other words, in FIG. 6, the concave portion 29e is formed substantially into a trapezoidal shape.

The convex portion 33c formed on the end surface 33b of the return yoke layer 33 on the leading side is formed so as to partly project substantially in the trapezoidal shape corresponding to the shape of the concave portion 29e formed on the end surface 29d of the main magnet pole layer 29 on the trailing side.

Figure 7:
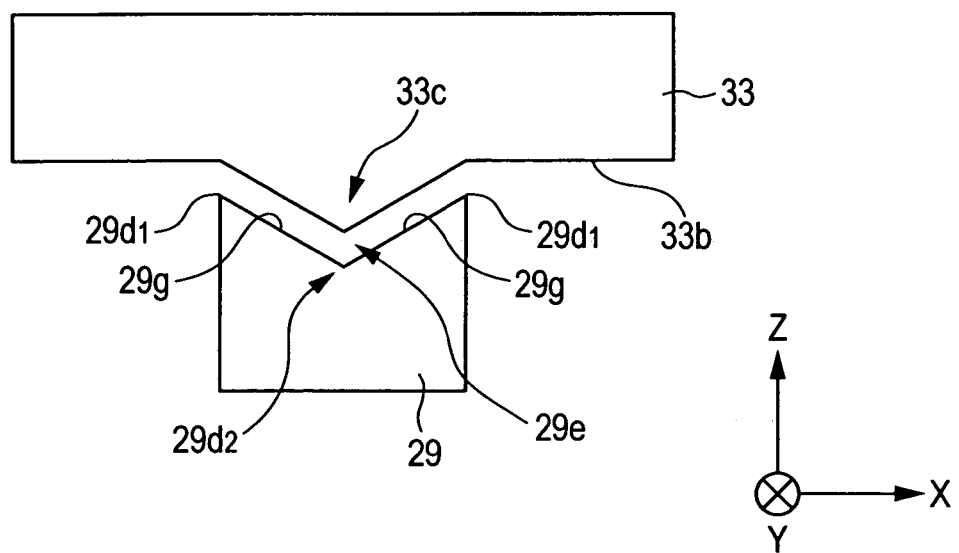
FIG. 7 is a front view of the perpendicular magnetic recording head of the invention having a different structure from FIG. 1 when viewed from the side of the opposing surface with respect to the recording medium.

In the invention, as shown in FIG. 7, it is also possible that the concave portion 29e formed on the end surface 29d of the main magnet pole layer 29 on the trailing side is formed of the inclined surfaces 29g, 29g so as to increase gradually in depth from the ends 29d1, 29d1 on the trailing side toward the center 29d2 on the trailing side, and the inclined surfaces 29g, 29g are formed so as to intersect at the position in the vicinity of the center portion 29d2 of the main magnet pole layer 29. In other words, in FIG. 7, the concave portion 29e is formed substantially into a triangular shape.

The convex portion 33c formed on the end surface 33b of the return yoke layer 33 on the leading side is formed so as to partly project substantially in the triangular shape corresponding to the shape of the concave portion 29e formed on the end surface 29d of the main magnet pole layer 29 on the trailing side.

Figure 8:
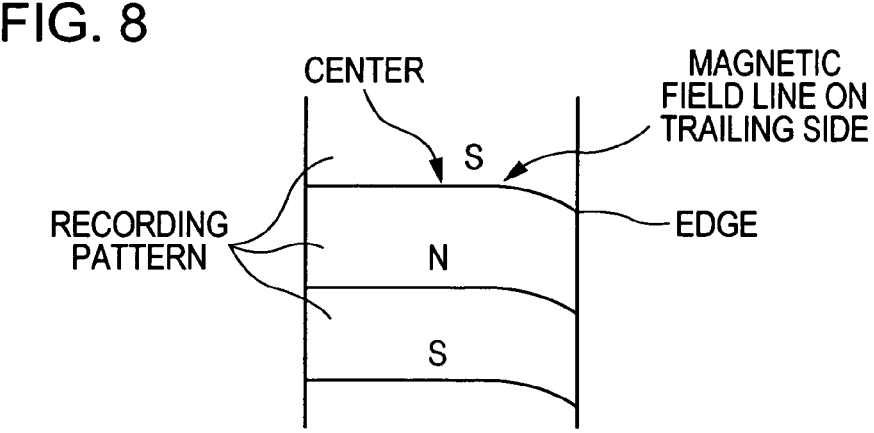
FIG. 8 is a front view of the perpendicular magnetic recording magnetic head of the present invention having a different structure from FIG. 1 when viewed from the side of the opposing surface with respect to the recording medium and the recording pattern recorded on the recording medium.
Figure 8:
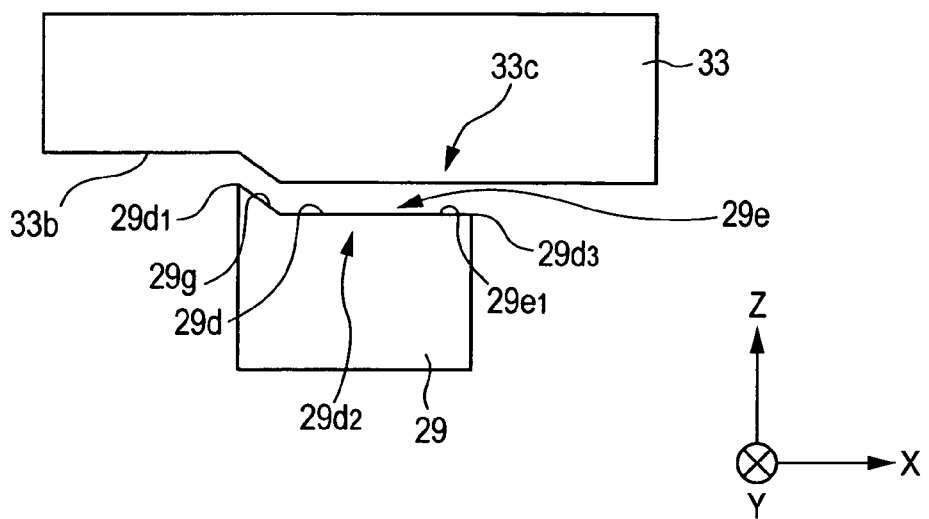

Alternatively, as shown in FIG. 8, the concave portion 29e formed on the end surface 29d of the main magnet pole layer 29 on the trailing side may include the incline surface 29g formed so as to increase gradually in depth from the one end 29d1 on the trailing side toward the center 29d2 on the trailing side and the flat bottom surface 29e1 formed in parallel with the direction of the width of the track (direction X in the drawing) continuing from the inclined surface 29g to the other end 29d3 on the trailing side.

The convex portion 33c formed on the end surface 33b of the return yoke layer 33 on the leading side is formed so as to partly project corresponding to the shape of the concave portion 29e formed on the end surface 29d of the main magnet pole layer 29 on the trailing side.

The embodiment shown in FIG. 8, like the embodiments shown in FIG. 2, FIG. 3, FIG. 6, and FIG. 7, achieves an effect which cannot be achieved by the comparative examples (FIG. 4, FIG. 5), described later, and hence the mode shown in FIG. 8 is also included in the invention.

The common characteristic of the embodiments shown in FIG. 2, FIG. 3, and FIG. 6 to FIG. 8 is that the end surface 29d of the main magnet pole layer 29 on the trailing side includes the concave portion 29e formed so that the center 29d2 in the direction of the width of the track (direction X in the drawing) on the trailing side is depressed at least more than the one end 29d1 in the direction of the width of the track on the trailing side.

In the invention having the characteristic as described above, when a signal pattern in the perpendicular magnetic field is recorded on the recording medium M by the perpendicular magnetic recording head H shown in FIG. 1, the magnetic field line of the recording pattern on the trailing side extends substantially in parallel with the direction of the width of the track (direction X in the drawing) in a linear shape as shown in FIG. 2. The linear shape of the magnetic field line on the trailing side in the invention can be proved clearly from the result of experiment measured by a magnetic force microscope (MFM) described later.

How the shape of the magnetic field line of the recording pattern would be affected primarily by the shape of the end surface 29d of the main magnet pole layer 29 on the trailing side. Since the isomagnetic line applied to the recording medium M from the position near the end surface 29d on the trailing side out of the isomagnetic lines to be applied from the front end surface 29c of the main magnet pole layer 29 onto the recording medium M is overwritten on the isomagnetic line previously applied to the recording medium M from the position near the end surface on the leading side, the shape of the magnetic field line between the adjacent recording patterns changes as the shape of the end surface 29d of the main magnet pole layer 29 on the trailing side changes.

Figure 29:
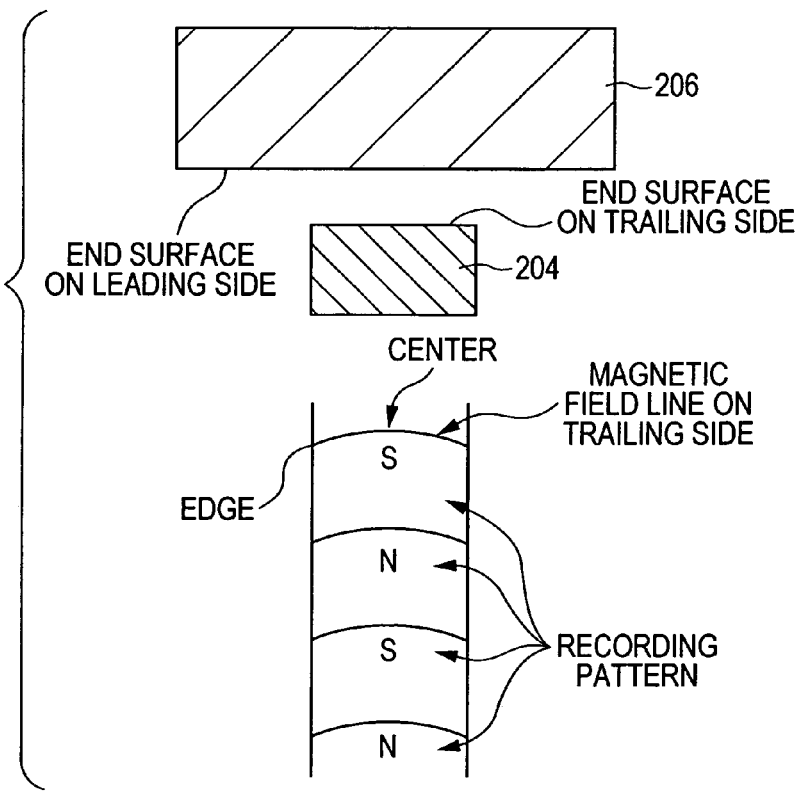
FIG. 29 is a partial front view of a perpendicular magnetic recording head (shield pole structure) including a recording pattern recorded on the recording medium in the related art.

As described in conjunction with FIG. 29, in the related art, the device whereof the end surface of the main magnet pole layer is flat, the magnetic field line of the recording pattern on the trailing side has a curved shape protruding from the edges toward the center in the trailing direction. Therefore, protruding at the center of the magnetic field line of the recording pattern on the trailing side can be restrained by at least depressing the center 29d2 of the end surface of the main magnet pole layer 29 on the trailing side, and as shown in FIG. 2, the magnetic field line of the recording pattern on the trailing side can be formed so as to extend in parallel with the direction of the width of the track in substantially linear shape.

In this manner, since the magnetic field line on the trailing side of the recording pattern can be approximated to the flat shape in comparison with the related art, lowering of the reproducing output which can be obtained when causing the reproduction device to travel on the recording pattern can be prevented, and the probability of reproducing the adjacent recording patterns astride is reduced, thereby restraining generation of noise.

The invention further includes a characteristic as follows. The return yoke layer 33 is formed on the trailing side when viewed from the main magnet pole layer 29, and a convex portion 33c is formed on the end surface 33b of the return yoke layer 33 on the leading side at the position opposing to the concave portion 29e formed on the main magnet pole layer 29 in the direction of the thickness of the film (direction Z in the drawing) and, in addition, the distance (gap length) between the main magnet pole layer 29 and the return yoke layer 33 in the direction of the thickness of the film (direction Z in the drawing) is constant.

The invention is so called a shield pole structure, in which the return yoke layer 33 is formed on the trailing side when viewed from the main magnet pole layer 29.

Figure 26:
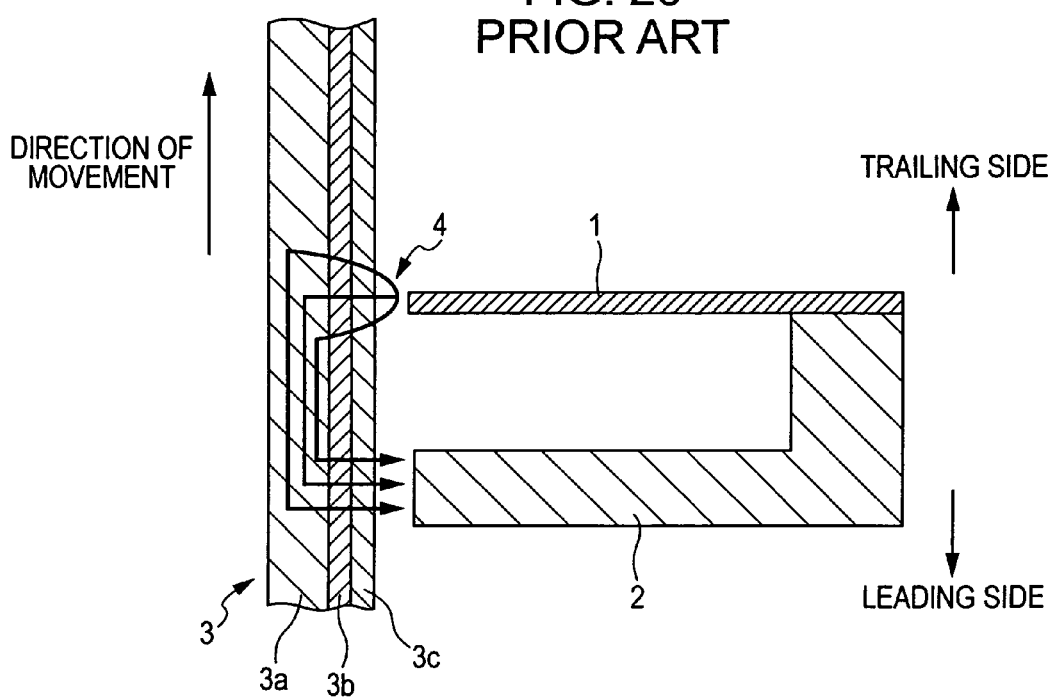
FIG. 26 is a partial cross-sectional view of a perpendicular magnetic recording head (single magnet pole head) in the related art.
Figure 27:
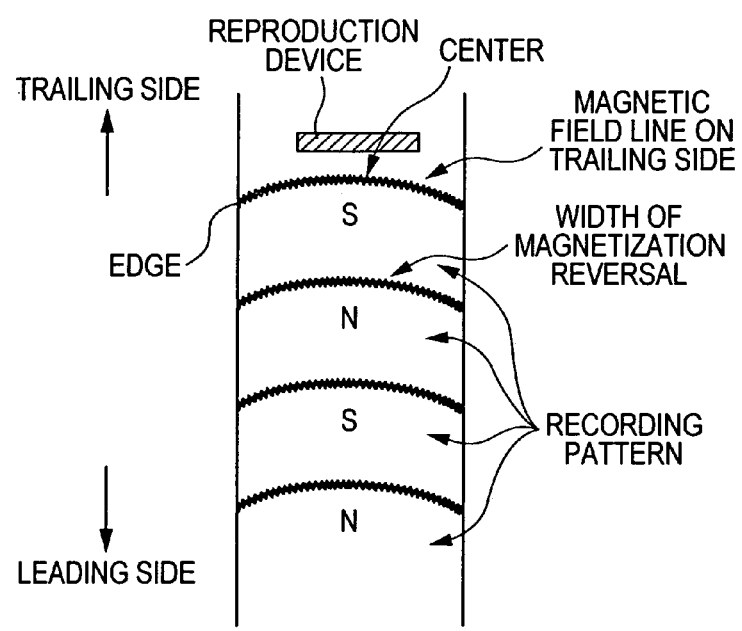
FIG. 27 is a drawing of a recording pattern recorded on the recording medium by using the perpendicular magnetic recording head.
Figure 28:
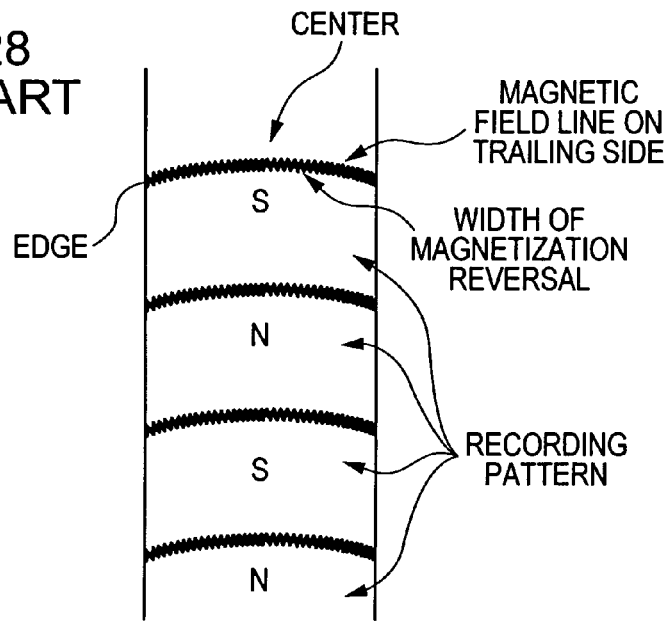
FIG. 28 is a drawing of a recording pattern recorded on the recording medium by using a perpendicular magnetic recording head.

In the perpendicular magnetic recording head having a shield pole structure, the recording magnetic field applied from the main magnet pole layer 29 toward the recording medium M can hardly be spread isotropically in comparison with the perpendicular magnetic recording head of a single magnet pole type shown in FIG. 26, whereby the recording magnetic field can easily be applied perpendicularly to the recording medium M effectively.

Figure 4:
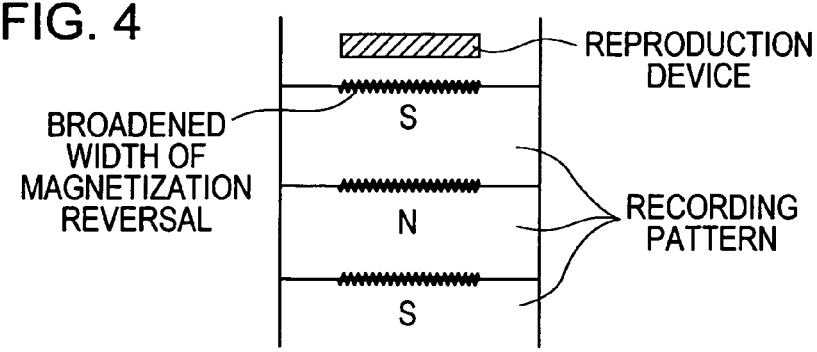
FIG. 4 is a front view of the perpendicular magnetic recording head of the comparative example viewed from the side of the opposing surface with respect to the recording medium, including a diagram of the recording pattern recorded on the recording medium.
Figure 4:
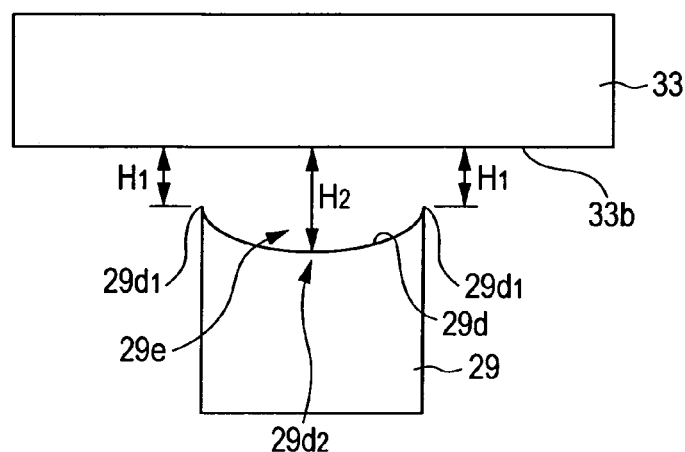

However, as shown in FIG. 4 for example, although the main magnet pole layer 29 is formed with the concave portion 29e on the end surface 29d on the leading side as the structure shown in FIG. 2, when the end surface 33b of the return yoke layer 33 on the leading side is not formed with the convex portion 33c and is the flat surface, the value of the distance (gap length) H1 between the ends 29d1, 29d1 of the main magnet pole layer 29 on the trailing side and the end surface 33b of the return yoke layer 33 on the leading side in the direction of the thickness of the film (direction Z in the drawing) and the value of the distance (gap length) H2 between the center 29d2 of the main magnet pole layer 29 on the trailing side and the end surface 33b of the return yoke layer 33 on the leading side in the direction of the thickness of the film (direction Z in the drawing) are different.

In this manner, when the distances H1, H2 between the main magnet pole layer 29 and the return yoke layer 33 show the different values and, in particular, as shown in FIG. 4, when the distance H2 between the center 29d2 of the main magnet pole layer 29 on the trailing side and the end surface 33b of the return yoke layer 33 on the leading side increases, the width of magnetization reversal (width of magnetization transition) between the recording patterns recorded on the recording medium M, which are magnetized reversely from each other increases at the center area thereof, whereby noise of magnetization reversal is added to the reproduction output obtained when reproduced by the reproduction device, whereby deterioration of the S/N ratio is resulted.

Figure 5:
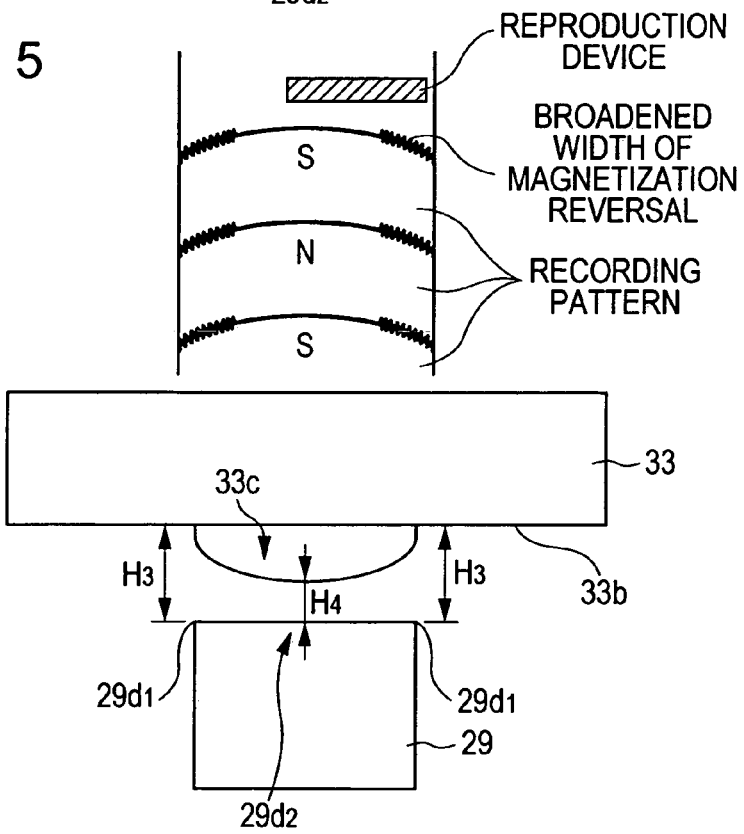
FIG. 5 is a front view of the perpendicular magnetic recording head of the comparative example viewed from the side of the opposing surface with respect to the recording medium, including a diagram of the recording pattern recorded on the recording medium.

In FIG. 5, although the return yoke layer 33 includes the concave portion 33c on the end surface 33b on the leading side as in the structure shown in FIG. 2, when the end surface 29d of the main magnet pole layer 29 on the trailing side is not formed with the concave portion 29e and is a flat surface, the value of the distance (gap length) H3 between the both ends 29d1, 29d1 of the main magnet pole layer 29 on the trailing side and the end surface 33b of the return yoke layer 33 on the leading side in the direction of the film thickness (direction Z in the drawing) and the value of the distance (gap length) H4 between the center 29d2 of the main magnet pole layer 29 on the trailing side and the end surface 33b of the return yoke layer 33 on the leading side in the direction of the film thickness (direction Z in the drawing) are different.

Since the concave portion 29e is not formed on the end surface 29d of the main magnet pole layer 29 on the trailing side in the structure shown in FIG. 5, the magnetic field line of the recording pattern on the trailing side to be recorded on the recording medium M is curved, and hence the problem that noise may be added to the reproduction output obtained by the reproduction device due to the distortion of the isomagnetic line cannot be solved. The reproduced output is also lowered due to the isomagnetic line.

In the structure shown in FIG. 5, when the distance H3, H4 between the main magnet pole layer 29 and the return yoke layer 33 shows the different values and, in particular, when the distance H3 between the both ends 29d1 of the main magnet pole layer 29 on the trailing side and the end surface 33b of the return yoke layer 33 on the leading side increases as shown in FIG. 5, the width of magnetization reversal (width of magnetization transition) between the recording patterns to be recorded on the recording medium M, which are magnetized reversely from each other, increases in the both end areas and, for example, when the reproduction device is displaced from the center area on the recording pattern and travels on the both end areas of the recording pattern, noise of magnetization reversal is added to the reproduction output obtained when the reproduction device reproduces, whereby deterioration of the S/N ratio is resulted.

On the other hand, the present invention is a perpendicular magnet recording head H of the shield pole structure, and in addition, the end surface 33b of the return yoke layer 33 on the leading side is formed with the concave portion 33c at a position opposing to the concave portion 29e formed on the main magnet pole layer 29 in the direction of the film thickness (Z direction in the drawing) and, furthermore, the distances (gap lengths) H5, H6 between the main magnet pole layer 29 and the return yoke layer 33 in the direction of film thickness (Z direction in the drawing) are constant in the entire area.

Therefore, as shown in FIG. 2, the width of magnetization reversal between the recording patterns recorded on the recording medium M, which are magnetized reversely from each other are reduced in the entire area from the edges to the center, and even when the reproduction device travels on any area on the recording pattern, noise of magnetization reversal is adequately prevented from being added to the reproduction output. Consequently, with the perpendicular magnetic recording head H according to the invention, the S/N ratio can be improved effectively.

As described above, the structures shown in FIG. 3, FIG. 6, FIG. 7, and FIG. 8 are presented as structures different from FIG. 2. Among these structures, the structure shown in FIG. 8 is such that the end surface 29d of the main magnet pole layer 29 is configured to be depressed at the center 29d2 on the trailing side in the direction of the width of he track (X direction in the drawing) with respect to the one end 29d1 on the trailing side, and to be formed into a flat surface (bottom surface 29e1 of the concave portion 29e) like the center 29d2 at the other end 29d3 on the trailing side. Therefore, the magnetic field line of the recording pattern, which is recorded on the recording medium M, on the trailing side is distorted at the position near one of the edges, and hence it is not possible to form the magnetic field line on the trailing side into a flat shape over the entire range from the both edges to the center. However, by depressing the end surface 29d1 of the main magnet pole layer 29 on the trailing side, in particular, the center 29d2 on the trailing side with respect to the one end 29d1 on the trailing side, the portion near the center on the trailing side can easily be formed into a flat shape, and when the reproduction device travels on the portion near the center of the recording pattern, the problems such that noise is added to the reproduced output or the output is lowered may be prevented.

However, since it is preferable that the magnetic field line of the recording pattern on the trailing side is formed into a flat shape over the entire area from the edges to the center, the structures of FIG. 2, FIG. 3, FIG. 6, or FIG. 7 are preferably employed than the structure shown in FIG. 8.

The distances (gap length) H5, H6 between the main magnet pole layer 29 in the invention are preferably between 50 nm and 100 nm. When the gap length increases, the width of magnetization reversal increases, and hence the gap length is preferably as narrow as possible. However, when it is too narrow, the dispersion amount of magnetization intensity leaking from the end surface 29d of the main magnet pole layer 29 on the trailing side to the end surface 33b of the return yoke layer 33 on the leading side increases, and hence the recording magnetic field is weakened. Therefore, too narrow gap length is not preferable.

Figure 9:
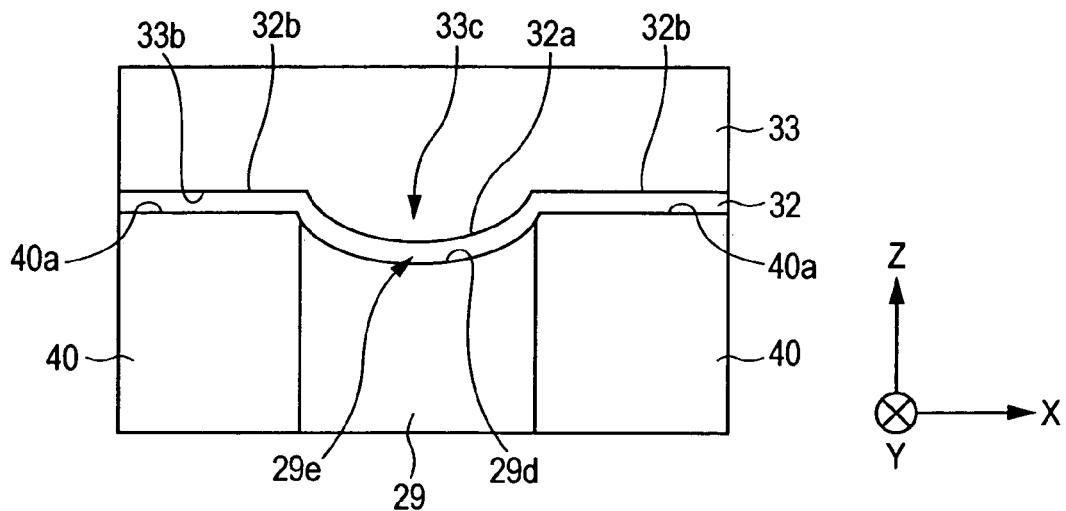
FIG. 9 is a partial front view showing a layer structure of the perpendicular magnetic recording head H in detail.
Figure 10:
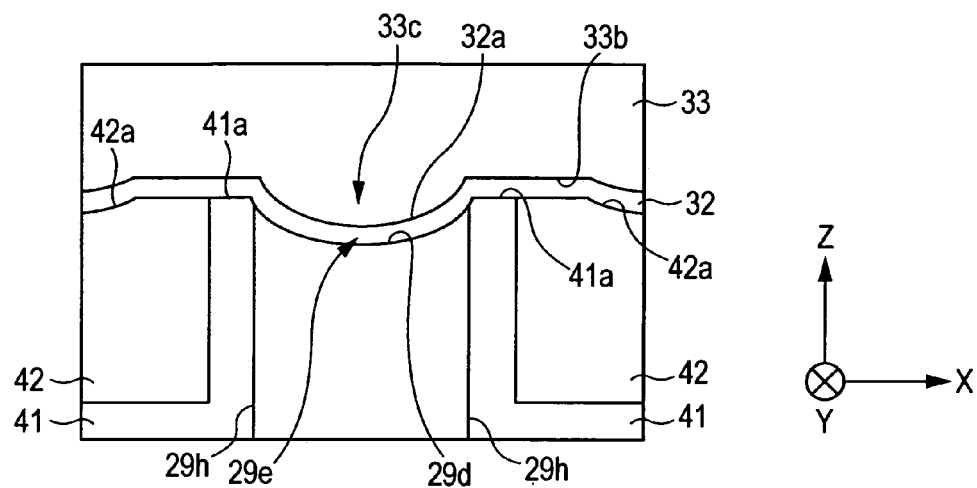
FIG. 10 is a partial front view showing a layer structure of the perpendicular magnetic recording head H in detail, having a different structure from FIG. 9.
Figure 11:
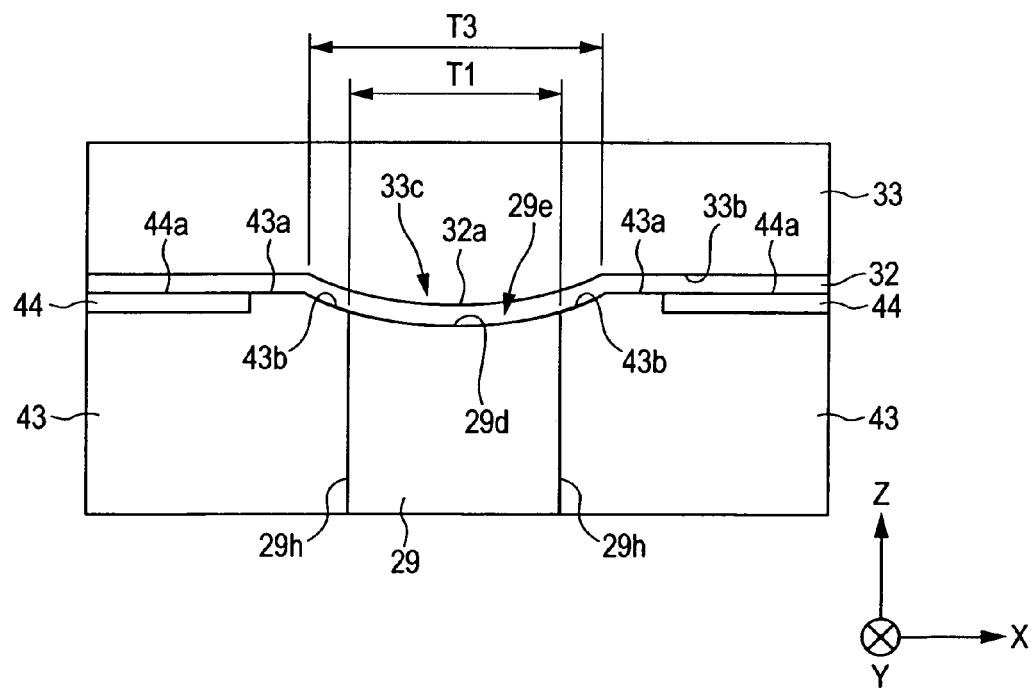
FIG. 11 is a partial front view showing a layer structure of the perpendicular magnetic recording head H in detail, having a different structure from FIG. 9.

FIG. 9 to FIG. 11 are partial front views of the vertical magnetic recording head H viewed from the surface opposing to the recording medium, and showing the layer structure in more details than in FIG. 2.

As shown in FIG. 9, on both sides of the main magnet pole layer 29 in the direction of the width of the track (direction X in the drawing), there are formed first insulating layers 40 formed of inorganic insulating material or the like such as $Al_2O_3$ or $SiO_2$. Upper surfaces 40a of the first insulating layers 40 are flat and extend in parallel with the direction of the width of the track (direction X in the drawing). In FIG. 9, as in FIG. 2, the end surface (upper surface) 29d of the main magnet pole layer 29 is formed entirely with the concave portion 29e. When viewed from the upper surfaces 40a of the first insulating layers 40, the entire area of the upper surface 29d of the main magnet pole layer 29 is formed into a depressed shape.

The first insulating layers 40 are formed of material having a lower milling rate than the main magnet pole layer 29. Therefore, according to the manufacturing method described later, the concave portion 29e is formed on the upper surface 29d of the main magnet pole layer 29 using the difference of the milling rate between the main magnet pole layer 29 and the first insulating layer 40.

As shown in FIG. 9, a gap layer 32 is formed from the upper surfaces 40a of the first insulating layers 40 toward the upper surface 29d of the main magnet pole layer 29. The gap layer 32 is formed by $SiO_2$ or the like by sputtering process, and the film thickness of the gap layer 32 is substantially constant at any portion. Therefore, the upper surface 32a of the gap layer 32 formed on the main magnet pole layer 29 is depressed in the same manner as the upper surface 29d of the main magnet pole layer 29. The upper surfaces 32b of the gap layer 32 formed on the first insulating layers 40 is formed into flat surfaces.

As shown in FIG. 9, the return yoke layer 33 is formed on the gap layer 32 by the frame plating technique. Since the concave portion is formed on the upper surface 32a opposing to the main magnet pole layer 29 of the gap layer 32 in the direction of the film thickness, the return yoke layer 33 formed above the concave portion is formed with a convex portion 33c from the lower surface 33b (end surface on the leading side) toward the main magnet pole layer 29. When only the shape of the main magnet pole layer 29 and the return yoke layer 33 are extracted, they are represented as shown in FIG. 2.

In the structure shown in FIG. 10, second insulating layers 41 of thin film thickness are formed from the end surfaces 29h, 29h on both sides of the main magnet pole layer 29 in the direction of the width of the track (direction X in the drawing) to the upper surface of the separation layer 27 and the upper surface of the yoke layer 28 shown in FIG. 1. Furthermore, on both sides of the second insulating layers 41 in the direction of the width of the track, third insulating layers 42 are formed, respectively.

As shown in FIG. 10, upper surfaces 41a of the second insulating layers 41 formed along the both end surfaces 29h of the main magnet pole layer 29 are formed substantially into flat surfaces, and upper surfaces 42a of the third insulating layers 42 are slightly depressed so as to apart from the second insulating layers 41 in the direction of the width of the track.

Materials for the main magnet pole layer 29, the third insulating layers 42, the second insulating layers 41 are selected so that the etching rates for the CMP (Chemical Mechanical Planarization) become lower in this order. For example, $SiO_2$ is selected for the second insulating layer 41, and $Al_2O_3$ is selected for the third insulating layer 42. In the invention, the concave portion 29e is formed on the upper surface 29d of the main magnet pole layer 29 using the difference of the etching rates of the second insulating layer 41 and the third insulating layer 42.

As shown in FIG. 10, the gap layer 32 is formed from the upper surfaces 41a, 42a of the second insulating layers 41 and the third insulating layers 42 to the upper surface 29d of the main magnet pole layer 29. The gap layer 32 is formed of $SiO_2$ or the like by sputtering process, and the film thickness of the gap layer 32 is substantially constant at any portion. Therefore, the upper surface 32a of the gap layer 32 formed on the main magnet pole layer 29 is resulted in the depressed shape as the upper surface 29d of the main magnet pole layer 29.

As shown in FIG. 10, the return yoke layer 33 is formed on the gap layer 32 by a technique such as frame plating technique. Since the concave portion is formed on the upper surface 32a which opposes to the main magnet pole layer 29 of the gap layer 32 in the direction of the film thickness, the return yoke layer 33 which is formed on the concave portion is formed with the convex portion 33c from the lower surface (end surface on the leading side) 33b toward the main magnet pole layer 29.

In the structure shown in FIG. 11, second insulating layers 43 (hereinafter referred to as fourth insulating layers in order to differentiate from the second insulating layer 41 in the structure shown in FIG. 10) are formed on both sides of the main magnet pole layer 29 in the direction of the width of the track. As shown in FIG. 11, the upper surfaces 43a of the fourth insulating layers 43 are not flat over the entire area, and include concave portions 43b formed of curved surfaces or inclined surfaces to a certain range so as to separate from both end surfaces 29h of the main magnet pole layer 29 in the direction of the width of the track (direction X in the drawing). This concave portions 43b continue to the concave portion 29e formed on the upper surface 29d of the main magnet pole layer 29.

As shown in FIG. 11, upper surfaces 44a of the third insulating layers (the third insulating layers are referred to as stopper layers hereinafter) 44, which serve as stoppers in the manufacturing process, are exposed on the upper surfaces 43a of the fourth insulating layers 43 on both sides thereof apart from the main magnet pole layer 29 in the direction of the width of the track so as to flush with the upper surfaces 43a.

The upper surfaces 44a of the stopper layers 44 are substantially flat in the same direction as the direction of the width of the track (direction X in the drawing).

Materials for the main magnet pole layer 29, fourth insulating layers 43, stopper layers 44 are selected so that the etching rates for the CMP become lower in this order. For example, $SiO_2$ is selected for the stopper layers 44, and $Al_2O_3$ is selected for the fourth insulating layer 44. In the invention, the concave portion 29e is formed on the upper surface 29d of the main magnet pole layer 29 using the difference of the etching rates of the main magnet pole layer 29, fourth insulating layer 43 and the stopper layer 44.

As shown in FIG. 11, the gap layer 32 is formed from the upper surfaces 43a, 44a of the fourth insulating layers 43 and the stopper layers to the upper surface 29d of the main magnet pole layer 29. The gap layer 32 is formed of $SiO_2$ or the like by sputtering process, and the film thickness of the gap layer 32 is substantially constant at any portion. Therefore, the upper surface 32a of the gap layer 32 formed on the main magnet pole layer 29 is resulted in the depressed shape as the upper surface 29d of the main magnet pole layer 29.

As shown in FIG. 11, the return yoke layer 33 is formed on the gap layer 32 by a technique such as frame plating technique. Since the concave portion is formed on the upper surface 32a which opposes to the main magnet pole layer 29 of the gap layer 32 in the direction of the film thickness (direction Z in the drawing), the return yoke layer 33 which is formed on the concave portion is formed with a convex portion 33c from the lower surface (end surface on the leading side) 33b toward the main magnet pole layer 29.

Although the structures of the perpendicular magnetic recording head H shown in FIG. 9 to FIG. 11 are all such that the concave portion 29e is formed on the upper surface 29d of the main magnet pole layer 29 by utilizing the difference of the milling rate of ion milling for the main magnet pole layer 29 and the insulating layers formed on both sides thereof or the difference of the etching rate for the CMP, it is understood that the dimensions of the concave portion 29e formed on the main magnet pole layer 29 and the convex portion 33c formed on the return yoke layer 33 in the direction of the width of the track are different depending on the layer structure.

The layer structures shown in FIG. 9 and FIG. 10, as that shown in FIG. 2, the maximum width of the concave portion 29e formed on the main magnet pole layer 29 in the direction of the width of the track (direction X in the drawing) is T1, while the maximum width of the concave portion 33c formed on the return yoke layer 33 is T2. The maximum widths T1 and T3 are identical. In the case of the structure shown in FIG. 3, the maximum width in the direction of the width of the track (direction X in the drawing) of the concave portion 29e formed on the main magnet pole layer 29 is T4, which is the distance between the positions B-B, and the maximum width T4 has the same value as the maximum width T5 in the direction of the width of the track of the convex portion 33c formed on the return yoke layer 33.

On the other hand, in the case of FIG. 11, the maximum width of the concave portion 29e formed on the main magnet pole layer 29 in the direction of the width of the track (X direction in the drawing) is T1, and the maximum width T3 of the convex portion 33c formed on the return yoke layer 33 in the direction of width of the track is slightly larger than the maximum width T1, and the maximum widths between the concave portion 29e and the convex portion 33c are not identical as shown in FIG. 2.

In the invention, most preferably, the maximum width of the concave portion 29e formed on the main magnet pole layer 29 and the maximum width of the convex portion 33c formed on the return yoke layer 33 are identical. It is because the width of magnetization reversal between the adjacent recording patterns recorded on the recording medium can be reduced, and hence the side fringing is reduced, thereby capable of realizing narrow track structure.

On the other hand, when the maximum width of the convex portion 33c formed on the return yoke layer 33 is smaller than the maximum width of the concave portion 29e formed on the main magnet pole layer 29, it is difficult to control the gap length between the main magnet pole layer 29 and the return yoke layer 33 to be constant over the entire area, and the portion having a larger width of magnetization reversal between the adjacent recording patterns recorded in the recording medium may be generated, thereby deterioration of the S/N ratio may easily be resulted.

As shown in FIG. 11, when the maximum width T3 of the convex portion 33c formed on the return yoke layer 33 is larger than the maximum width T1 of the concave portion 29e formed on the main magnetic layer 29, the gap length between the main magnet pole layer 29 and the return yoke layer 33 can be controlled to be constant over the entire area by employing the layer structure as shown in FIG. 11, and the width of magnetization reversal between the adjacent recording patterns recorded on the recording medium can easily be reduced. However, in the structure shown in FIG. 11, when the maximum width T3 of the convex portion 33c formed on the return yoke layer 33 is too large in comparison with the maximum width T1 of the concave portion 29e formed on the main magnet pole layer 29, narrowing of the track cannot be achieved adequately. Therefore, the maximum width T3 of the convex portion 33c formed on the return yoke layer 33 is preferably in the range slightly wider than the maximum width T1 of the concave portion 29e formed on the main magnet pole layer 29 (within the range of maximum width T3/maximum width T1≈1.0-2.0 μm).

In the invention, the width of the upper surface 29d of the main magnet pole layer 29 in the direction of the width of the track (width of the track Tw) is preferably in the order of 0.01 μm-0.3 μm.

From FIG. 12 to FIG. 16 are process drawings showing a method of manufacturing the perpendicular magnetic recording head having the layer structure shown in FIG. 9. The respective drawings show partial front views of the perpendicular magnetic recording head during manufacturing process.

Figure 12:
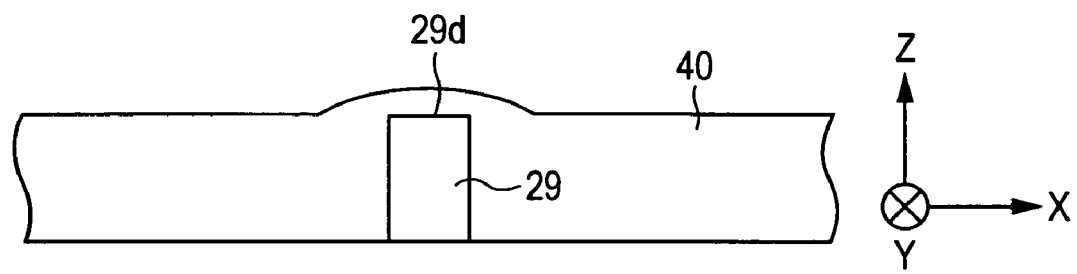
FIG. 12 is a process drawing showing a process of manufacturing the perpendicular magnetic recording head having the structure shown in FIG. 9.

In the process shown in FIG. 12, the main magnet pole layer 29 is plated on the separation layer 27 and the yoke layer 28 shown in FIG. 1 by utilizing a technique such as frame plating technique. Subsequently, as shown in FIG. 12, the first insulating layers 40 formed of inorganic insulating material such as $Al_2O_3$ or $SiO_2$ is formed by utilizing a technique such as sputtering process from both sides of the main magnet pole layer 29 in the direction of the width of the track (direction X in the drawing) to the upper surface 29d of the main magnet pole layer 29 so as to cover entirely over the periphery and the upper side of the main magnet pole layer 29.

Here, material which is low in milling rate with respect to the ion milling than the main magnet pole layer 29 is selected as inorganic insulating material used for the first insulating layer 40. In the ion milling executed in a post-process, for example, neutral argon (Ar) is used as gas, and an ion beam voltage is in the order of 400V and an ion beam current is in the order of 300 mA.

Figure 13:
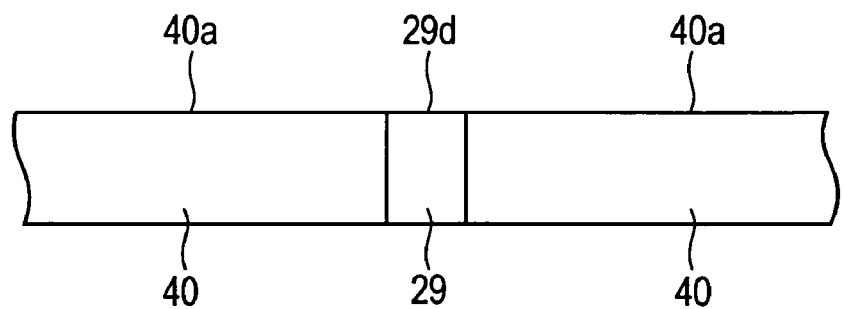
FIG. 13 is a process drawing showing a process to be performed next to the process in FIG. 12.

In the process shown in FIG. 13, the upper surfaces 40a of the first insulating layers 40 are polished until the upper surface 29d of the main magnet pole layer 29 is exposed using the CMP technique or the like. FIG. 13 shows a state after polishing and, as shown in FIG. 13, the upper surface 29d of the main magnet pole layer 29 and the upper surface 40a of the first insulating layer 40 are formed as the identical flat plane.

Figure 14:
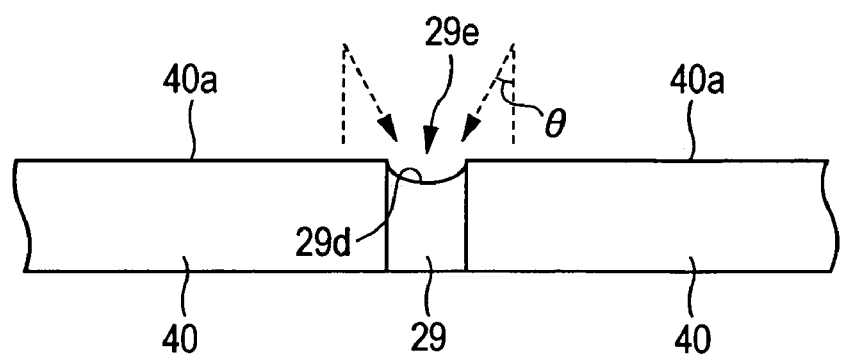
FIG. 14 is a process drawing showing a process to be performed next to the process in FIG. 13.

In the process shown in FIG. 14, the concave portion 29e is formed on the upper surface 29d by ion milling the upper surface 29d of the main magnet pole layer 29.

As conditions of the ion milling, as described above, the gas is neutral argon (Ar), the ion beam voltage is in the order of 400V, and the ion beam current is in the order of 300 mA.

The angle of beam inclination θ of the ion milling is set to 5° to 65° from the perpendicular direction with respect to the substrate surface (direction of the film thickness, Z direction in the drawing).

In this manner, by the ion milling from the oblique direction, with the aid of the shadow effect due to the existence of the first insulating layer 40 having low milling rate, the upper surface 29d of the main magnet pole layer 29 is formed with a curved shaped concave portion 29e by milling deeper at the center than at the both ends. Since there is a first insulating layer 40 at both ends of the main magnet pole layer 29 in the direction of the width of the track, the main magnet pole layer 29 is affected only on its upper surface 29d by the ion milling.

It seems that the first insulating layers 40 are also milled slightly by the ion milling, since the first insulating layers 40 are formed of material which is lower in milling rate than the main magnet pole layer 29, the first insulating layers 40 are not affected by the ion milling as much as the upper surface 29d of the main magnet pole layer 29, and the upper surfaces 40a of the first insulating layers 40 remain as substantially flat surfaces even after ion milling. The ion milling may be executed only within the range of the predetermined length L1 in the height direction (direction Y in the drawing) from the opposing surface H1a with respect to the recording medium as shown in FIG. 1 to form the concave portion 29e partly on the upper surface 29d of the distal end 29a of the main magnet pole layer 29, or may be executed to form the concave portion 29e on the entire area of the upper surface 29d from the opposing surface H1a to the rear end surface 29f of the main magnet pole layer 29.

Figure 15:
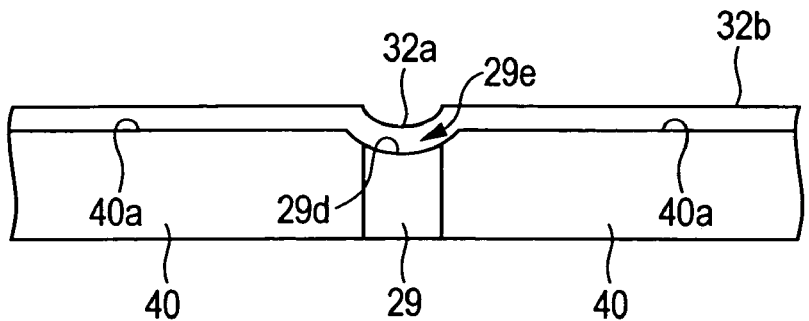
FIG. 15 is a process drawing showing a process to be performed next to the process in FIG. 14.

In the process shown in FIG. 15, the gap layer 32 is formed of $SiO_2$ or the like from the upper surface 40a of the first insulating layer 40 to the upper surface 29d of the main magnet pole layer 29 with the technique such as the sputtering process.

The gap layer 32 formed by the sputter process is formed substantially at a constant thickness at any portion. In other words, the gap layer 32 is formed at substantially the same film thickness both on the concave portion 29e of the main magnet pole layer 29 and on the upper surfaces 40a of the first insulating layers 40.

Therefore, on the upper surface of the gap layer 32 formed in the process shown in FIG. 15, the flat surfaces 32b formed on the first insulating layers 40 and the concave portion 32a formed on the upper surface 29d of the main magnet pole layer 29.

Figure 16:
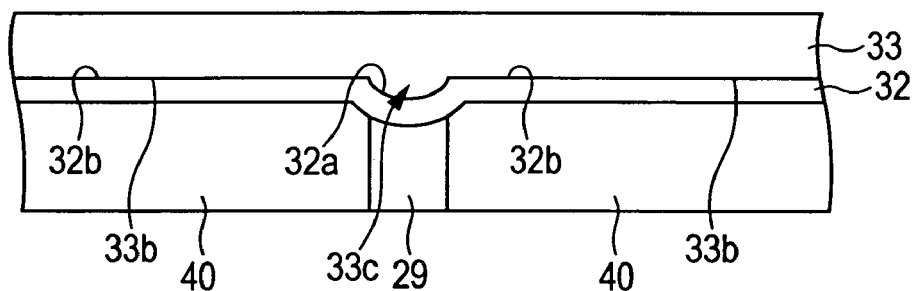
FIG. 16 is a process drawing showing a process to be performed next to the process in FIG. 15.

Then, in the process shown in FIG. 16, the return yoke layer 33 is plated on the gap layer 32 using the frame plating technique or the like.

As shown in FIG. 16, since the return yoke layer 33 is formed from the flat surfaces 32b on the gap layer 32 to the concave portion 32a, the return yoke layer 33 formed on the concave portion 32a is formed with the convex portion 33c projecting toward the main magnet pole layer 29 when viewed from the lower surface 33b of the return yoke layer 33 formed on the flat surface 32b.

Figure 17:
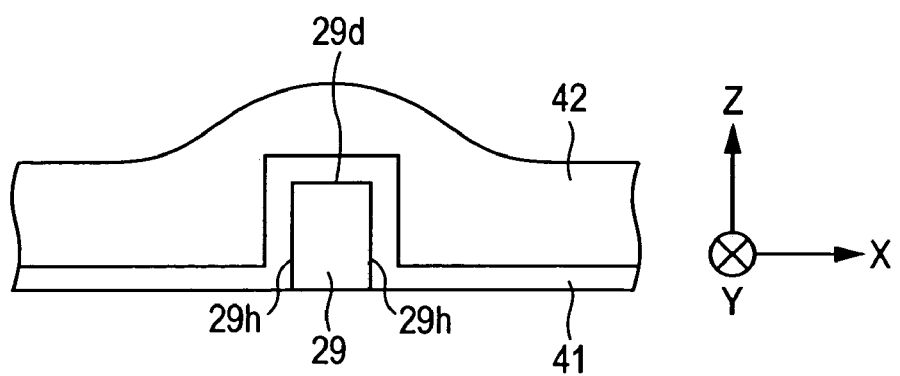
FIG. 17 is a process drawing showing a process of manufacturing the perpendicular magnetic recording head having a structure shown in FIG. 10.
Figure 18:
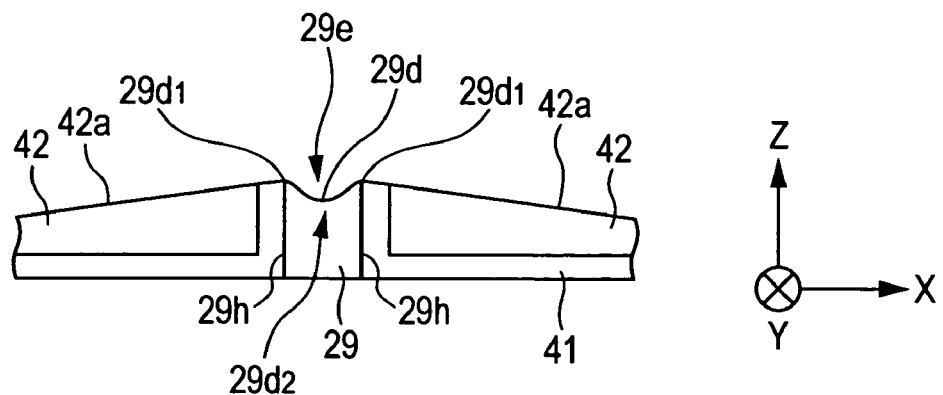
FIG. 18 is a process drawing showing a process to be performed next to the process in FIG. 17.
Figure 19:
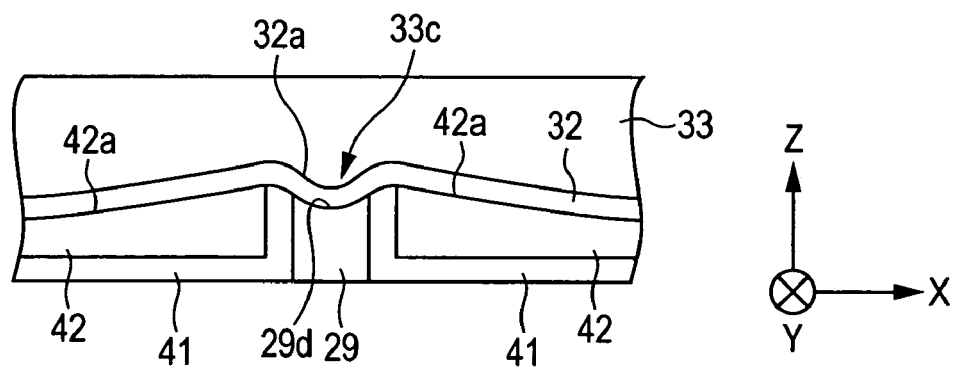
FIG. 19 is a process drawing showing a process to be performed next to the process in FIG. 18.

FIG. 17 to FIG. 19 are process drawings showing a method of manufacturing the perpendicular magnetic recording head having the layer structure shown in FIG. 10. The respective drawings show partial front view of the perpendicular magnetic recording head during the manufacturing process.

In the process shown in FIG. 17, the main magnet pole layer 29 is plated on the separation layer 27 and the yoke layer 28 shown in FIG. 1 by the frame plating technique. Subsequently, as shown in FIG. 17, the second insulating layer 41 having a small thickness is formed along the upper surface of the separation layer 27 and the yoke layer 28 shown in FIG. 1 by the sputtering process.

As shown in FIG. 17, the third insulating layer 42 is formed by the sputtering process so as to cover the upper surface of the second insulating layer 41 completely by a thicker film thickness than the second insulating layer 41.

In the subsequent process, the second insulating layer 41, the third insulating layer 42, and the main magnet pole layer 29 are polished by the use of the CMP technique so as to obtain a predetermined shape. Materials of the main magnet pole layer 29, the third insulating layer 42, the second insulating layer 41 are selected so that the etching rate of the CMP is lowered in this order. For example, $SiO_2$ is selected for the second insulating layer 41, and $Al_2O_3$ is selected for the third insulating layer 42. The etching rate of the second insulating layer 41 and the third insulating layer 42 formed of inorganic insulating material is lower than that of the main magnet pole layer 29 formed of magnetic material.

Subsequently, the upper surface of the third insulating layer 42 is polished from the state shown in FIG. 17 by the use of the CMP technique. When the upper surface of the third insulating layer 42 is continuously polished, the upper surface of the second insulating layer 41 formed on the upper surface 29d of the main magnet pole layer 29 is exposed. Since the second insulating layer 41 is low in etching rate than the third insulating layer 42, when polishing by CMP is continued, the third insulating layer 42 is etched more than the second insulating layer 41, and hence the upper surface 42a of the third insulating layer 42 is formed into an inclined or curved shape so as to reduce gradually in film thickness in the direction apart from the third insulating layer 42 in the direction of the width of the track (direction X in the drawing).

When the polishing process by the CMP is continued, the second insulating layer 41 formed on the upper surface 29d of the main magnet pole layer 29 is entirely removed, and then the upper surface 29d of the main magnet pole layer 29 is exposed. Then, when the polishing process by the CMP is further continued, the upper surface 29d of the main magnet pole layer 29 which is the highest in etching rate is etched more than the second insulating layer 41 or the third insulating layer 42. At this time, since there exists the second insulating layer 41, which is most hard to be etched, on both end surfaces 29h of the main magnet pole layer 29 as shown in FIG. 18, the both sides which are closest to the both end surface 29h of the upper surface 29d of the main magnet pole layer 29 can hardly be milled, while the portion of the upper surface 29d near the center is capable of being milled most easily. Therefore, as shown in FIG. 18, the concave portion 29e of, for example, a curved shape which increases gradually in depth from the both ends 29d1, 29d1 toward the center 29d2 is formed on the upper surface 29d of the main magnet pole layer 29.

In the process shown in FIG. 17, when the both sides of the main magnet pole layer 29 in the direction of the width of the track (direction X in the drawing) and the upper side thereof are entirely covered by the second insulating layer 41, the second insulating layer 41 is too low in etching rate for the CMP, and hence it takes long time until the upper surface 29d of the main magnet pole layer 29 is exposed, whereby the manufacturing process takes a long time. On the other hand, when the both sides of the main magnet pole layer 29 in the direction of the width of the track and the upper side thereof are entirely covered by the third insulating layer 42, although the state in which the upper surface 29d of the main magnet pole layer 29 is exposed can be obtained early by polishing by the CMP, since the difference of the etching rate between the third insulating layer 42 and the main magnet pole layer 29 by the CMP is not as high as the difference of the etching rate between the second insulating layer 41 and the main magnet pole layer 29, the concave portion 29e of an adequate shape can hardly be formed on the upper surface 29d of the main magnet pole layer 29.

Therefore, according to the invention, it is preferable to form the second insulating layer 41 which is the lowest in etching rate along the both end surfaces 29h of the main magnet pole layer 29 by the CMP, and form the third insulating layer 42 which is higher in etching rate at least than the second insulating layer 41 on both sides of the main magnet pole layer 29 via the second insulating layer 41 by the CMP (the etching rate of the third insulating layer 42 may be higher than that of the main magnet pole layer 29).

Subsequently, in the process shown in FIG. 19, the gap layer 32 formed of $SiO_2$ or the like is formed from the upper surface 29d of the main magnet pole layer 29, the upper surfaces of the second insulating layers 41 formed on both side surfaces 29h of the main magnet pole layer 29, and the upper surfaces 42a of the third insulating layer 42 by the use of the technique such as the sputtering process. As described in the process shown in FIG. 15, the gap layer 32 is formed so as to have substantially the same film thickness at any portions.

As shown in FIG. 19, the upper surface of the gap layer 32 is formed with the concave portion 32a at a position opposing to the upper surface 29d of the main magnet pole layer 29 in the direction of the film thickness (direction Z in the drawing).

In the process shown in FIG. 19, the return yoke layer 33 is plated on the gap layer 32 by the use of the frame plating technology.

As shown in FIG. 19, the return yoke layer 33 formed on the concave portion 32a of the gap layer 32 is formed as the convex portion 33c projecting toward the main magnet pole layer 29.

FIG. 20 to FIG. 23 are process drawing showing the method of manufacturing the perpendicular magnetic recording head of the layer structure shown in FIG. 11. The respective drawings show partial front views of the perpendicular magnetic recording head during the manufacturing process.

Figure 20:
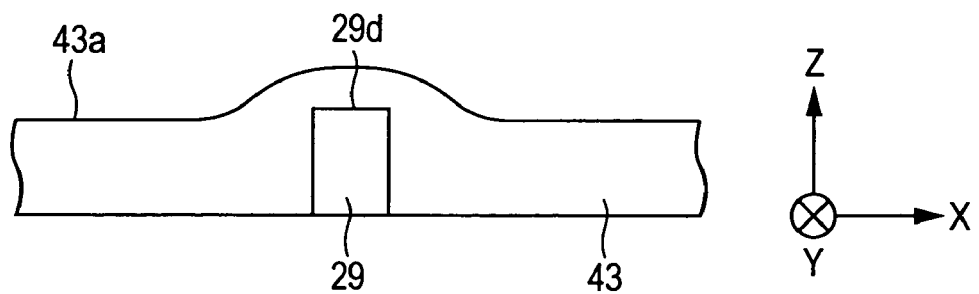
FIG. 20 is a process drawing showing a process of manufacturing the perpendicular magnetic recording head shown in FIG. 11.

In the process shown in FIG. 20, the main magnet pole layer 29 is plated on the separation layer 27 and the yoke layer 28 shown in FIG. 1 by the use of the frame plating technique. Subsequently, as shown in FIG. 20, the fourth insulating layer 43 is formed from both sides of the main magnet pole layer 29 in the direction of the width of the track (direction X in the drawing) to the upper part of the main magnet pole layer 29 by the sputtering process or the like. The upper surface 43a of the fourth insulating layer 43 formed on both sides of the main magnet pole layer 29 is preferably flush with the upper surface 29d of the main magnet pole layer 29 or slightly lower than the upper surface 29d of the main magnet pole layer 29.

Figure 21:
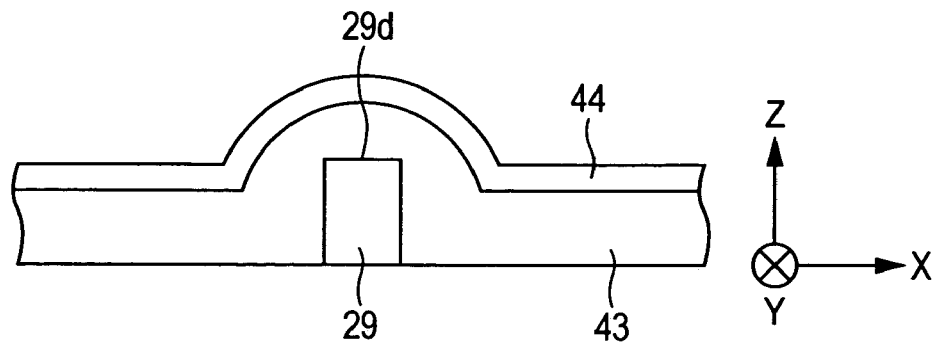
FIG. 21 is a process drawing showing a process to be performed next to the process in FIG. 20.

As shown in FIG. 21, the stopper layer 44 formed by the inorganic insulation material or the like is formed on the fourth insulating layer 43 by the sputtering process or the like.

Here, materials for the main magnet pole layer 29, the fourth insulating layers 43, the stopper layers 44 are selected so that the etching rates for the CMP become lower in this order. For example, $Al_2O_3$ is selected for the fourth insulating layer 43 and $SiO_2$ is selected for the stopper layer 44. The fourth insulating layer 43 and the stopper layer 44 formed of inorganic insulating material is lower in etching rate than the main magnet pole layer 29 formed of magnetic material.

Then, from the state shown in FIG. 21, the stopper layer 44 and the fourth insulating layer 43 formed on the upper part of the main magnet pole layer 29 so as to protrude therefrom is polished by the use of the CMP technique. When the stopper layer 44 and the fourth insulating layer 43 are polished until the upper surface 29d of the main magnet pole layer 29 is exposed, the fourth insulating layers 43 on the both sides of the main magnet pole layer 29 in the direction of the width of the track (direction X in the drawing) and the stopper layers 44 having lower etching rate than the fourth insulating layers 43 are partly remained at the position apart from the both sides of the main magnet pole layer 29 by a predetermined distance.

Figure 22:
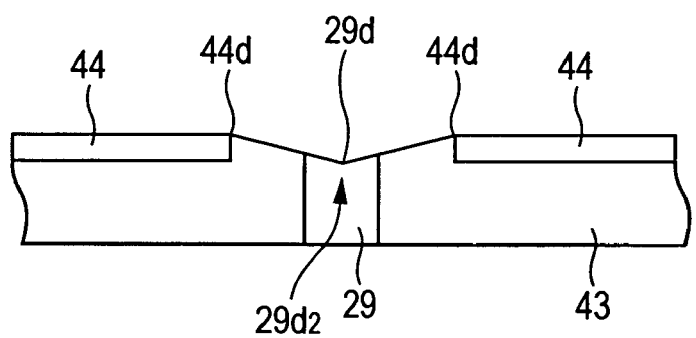
FIG. 22 is a process drawing showing a process to be performed next to the process in FIG. 21.

When polishing process by the CMP is further proceeded from this state, the fourth insulating layer 43 and the main magnet pole layer 29 located inside the stopper layers 44, which can most hardly be milled, in the direction of the width of the track (direction X in the drawing) are first milled. As shown in FIG. 22, the fourth insulating layer 43 is low in etching rate than the main magnet pole layer 29, and the fourth insulating layers 43 near the stopper layer 44 can hardly be milled by the CMP due to the existence of the stopper layers 44, while the upper surfaces 43a of the fourth insulating layers 43 can easily be milled more on the inner side (toward the main magnet pole layer 29) than the stopper layer 44. However, since the main magnet pole layer 29 is milled faster than the fourth insulating layer 43, the inclined surface or the curved surface which increase gradually in depth from the inner end portions 44b of the stopper layers 44 toward the center 29d2 of the upper surface 29d of the main magnet pole layer 29 is formed on the upper surface of the fourth insulating layer 43 and the upper surface 29d of the main magnet pole layer 29.

Figure 23:
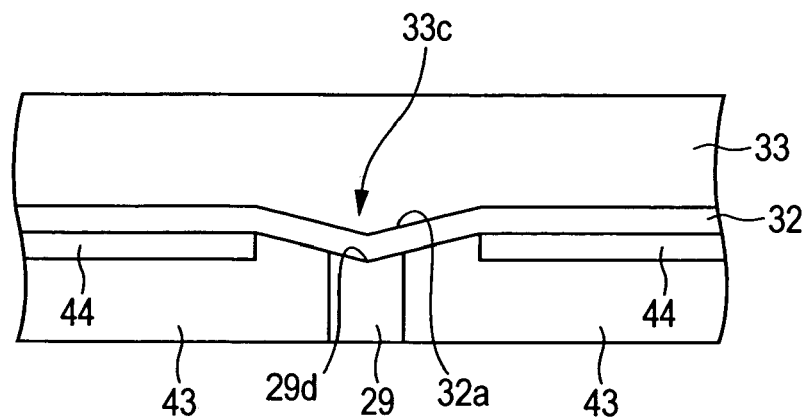
FIG. 23 is a process drawing showing a process to be performed next to the process in FIG. 22.

As shown in FIG. 23, the gap layer 32 formed of $SiO_2$ or the like is formed over the upper surface 29d of the main magnet pole layer 29, the upper surfaces of the fourth insulating layers 43 formed on the both sides of the main magnet pole layer 29, and the upper surfaces of the stopper layers 44 by the sputter process or the like. The gap layer 32 is, as described in FIG. 15, formed at a constant film thickness at any portion.

As shown in FIG. 23, the concave portion 32a is formed on the upper surface of the gap layer 32 formed on the upper surface of the fourth insulating layers 43 and on the upper surface 29d of the main magnet pole layer 29.

In the process shown in FIG. 23, the return yoke layer 33 is plated on the gap layer 32 by the use of the frame plating technique or the like.

As shown in FIG. 23, the return yoke layer 33 formed on the concave portion 32a of the gap layer 32 is formed as the convex portion 33c projecting toward the main magnet pole layer 29.

As described above, according to the method of manufacturing the perpendicular magnetic recording head according to the invention described in conjunction with FIG. 12 to FIG. 23, the concave portion 29e can be formed appropriately and easily on the upper surface 29d of the main magnet pole 29 by forming the insulating layer which is low in milling rate for the ion milling or in etching rate for the CMP than the main magnet pole layer on the upper surface or on the both sides in the direction of the width of the track of the main magnet layer, and by utilizing the difference of milling rate for the ion milling or the difference of etching rate for the CMP.

Figure 24:
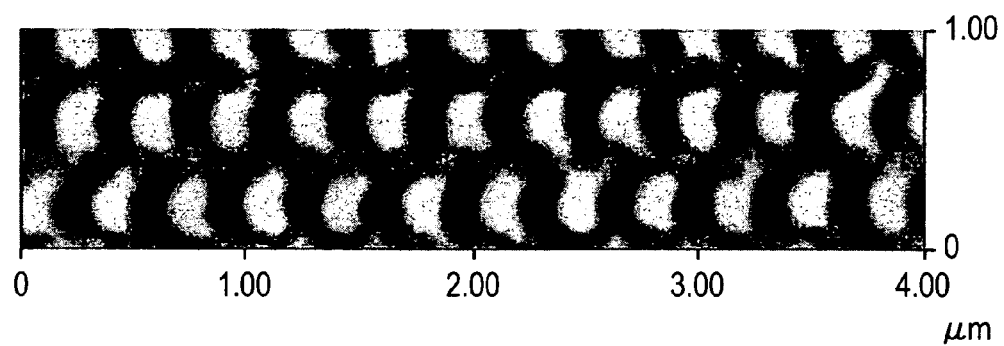
FIG. 24 is an image of a recording pattern recorded on the recording medium using the perpendicular magnetic recording head of the comparative example taken through the magnetic force microscope.
Figure 25:
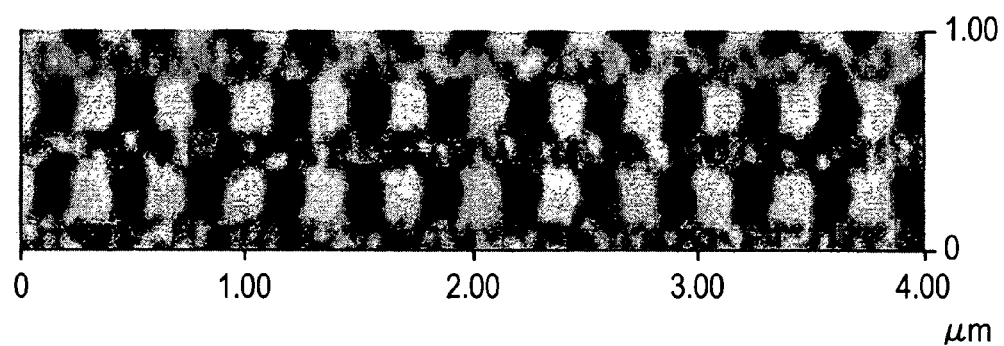
FIG. 25 is an image of a recording pattern recorded on the recording medium using the perpendicular magnetic recording head of the embodiment taken through a magnetic force microscope.

FIG. 24 is an image of a recording pattern recorded on the recording medium using the perpendicular magnetic recording head of the comparative example taken through the magnetic force microscope, and FIG. 25 is an image of the recording pattern recorded on the recording medium by using the perpendicular magnetic recording head of this embodiment taken through the magnetic force microscope.

Although the perpendicular magnetic recording head of the comparative example shown in FIG. 24 has the same shape as the structure shown in FIG. 29 and is the shield pole structure, the end surface of the main magnet pole layer 204 on the trailing side and the end surface of the return yoke layer 206 on the leading side were formed as flat surfaces. The distance (gap length) between the main magnet pole layer 204 and the return yoke layer 206 in the direction of the film thickness was determined to be 0.25 μm.

On the other hand, the perpendicular magnetic recording head of the embodiment shown in FIG. 25 has the same shape as the structure shown in FIG. 2 and is the shield pole structure, and includes the concave portion 29e formed on the end surface 29d of the main magnet pole layer 29 on the trailing side and the convex portion 33c formed on the end surface 33b of the return yoke layer 33 on the leading side. The shapes of the concave portion 29e and of the convex portion 33c are the shape having the curved shape in cross-section taken along the direction parallel to the opposing surface with respect to the recording medium as in FIG. 2.

The distance (gap length) between the concave portion 29e and the convex portion 33c in the direction of the film thickness is equalized to 0.05 μm over the entire area.

In both FIG. 24 and FIG. 25, the left side of the recording pattern is the trailing side and the right side is the leading side.

In the comparative example shown in FIG. 24, the magnet field line of the recording pattern on the trailing side was found to be a curved surface protruding toward the trailing direction from the edges to the center.

On the other hand, in the embodiment shown in FIG. 25, the magnetic field line of the recording pattern on the trailing side was found to be substantially flat from the edges to the center.

In this manner, it was found that the concave portion 29e which is depressed from the both ends 29d1, 29d1 on the trailing side to the center 29d2 on the trailing side must simply be formed on the end surface 29d of the main magnet pole layer 29 on the trailing side in order to flatten the magnetic field line on the trailing side.

What is claimed is:

1. A perpendicular magnetic recording head comprising:
a main magnet pole layer formed of magnetic material; and
a return yoke layer being formed of magnetic material and opposing to the main magnet pole layer with an intermediary of a non-magnetic gap layer on the side of the surface opposing to a recording medium and on the trailing side of the main magnet pole layer,
wherein the end surface of the main magnet pole layer on the trailing side is depressed at the center in the direction of the width of the track on the trailing side with respect to one of the end on the trailing side, and
wherein the end surface of the return yoke layer on the leading side is formed with a convex portion at a position opposing to a concave portion formed on the end surface of the main magnet pole layer on the trailing side in the direction of the film thickness, and the distance between the main magnet pole layer and the return yoke layer in the direction of the film thickness is constant.

2. The perpendicular magnetic recording head according to claim 1, wherein the cross-sections of the concave portion and the convex portion taken in the direction parallel to the surfaces opposing to the recording medium are gradually inclined or bent from both ends in the direction of the width of the track toward the center.

3. The perpendicular magnetic recording head according to claim 2, wherein the cross sections of the concave portion and the convex portion taken along the direction parallel to the surfaces opposing to the recording medium are both curved shape.

4. The perpendicular magnetic recording head according to claim 1, wherein the maximum widths of the concave portion and the convex portion in the direction of the width of the track are identical.

* * * * *